US012501129B2

(12) United States Patent
Kim

(10) Patent No.: US 12,501,129 B2
(45) Date of Patent: Dec. 16, 2025

(54) IMAGE SENSOR, CAMERA MODULE, AND ELECTRONIC DEVICE INCLUDING THE SAME

(71) Applicant: SAMSUNG ELECTRO-MECHANICS CO., LTD., Suwon-si (KR)

(72) Inventor: Hyun Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 317 days.

(21) Appl. No.: 17/836,553

(22) Filed: Jun. 9, 2022

(65) Prior Publication Data

US 2023/0023158 A1 Jan. 26, 2023

(30) Foreign Application Priority Data

Jul. 16, 2021 (KR) .......................... 10-2021-0093417
Jan. 6, 2022 (KR) .......................... 10-2022-0002128

(51) Int. Cl.
*H04N 23/52* (2023.01)
*H04N 23/55* (2023.01)
*H04N 23/67* (2023.01)
*H04N 23/80* (2023.01)

(52) U.S. Cl.
CPC ............ *H04N 23/52* (2023.01); *H04N 23/55* (2023.01); *H04N 23/67* (2023.01); *H04N 23/80* (2023.01)

(58) Field of Classification Search
CPC ........ H04N 23/52; H04N 23/55; H04N 23/67; H04N 23/80; H04N 23/57; H04N 23/687; H04N 23/54
See application file for complete search history.

(56) References Cited

U.S. PATENT DOCUMENTS

| | | | | |
|---|---|---|---|---|
| 5,034,821 | A * | 7/1991 | Desmons | H04N 23/15 396/378 |
| 5,369,281 | A * | 11/1994 | Spinnler | H04N 9/12 257/443 |
| 5,793,433 | A | 8/1998 | Kim et al. | |
| 9,681,052 | B1 * | 6/2017 | Lewkow | H04N 23/6812 |
| 10,401,598 | B2 * | 9/2019 | Byler | G02B 25/001 |
| 10,539,764 | B2 * | 1/2020 | Sasaki | G02B 13/08 |
| 10,893,200 | B2 * | 1/2021 | Ba-Tis | G03B 5/06 |
| 11,250,617 | B1 * | 2/2022 | Sempe | H04L 65/611 |
| 11,314,147 | B1 * | 4/2022 | Sharma | G03B 13/36 |

(Continued)

FOREIGN PATENT DOCUMENTS

| | | |
|---|---|---|
| JP | 2012-85258 A | 4/2012 |
| KR | 10-1996-0036638 A | 10/1996 |

(Continued)

OTHER PUBLICATIONS

Korean Office Action issued on Oct. 27, 2023, in counterpart Korean Patent Application No. 10-2022-0002128 (10 pages in English, 8 pages in Korean).

(Continued)

*Primary Examiner* — Chiawei Chen

(74) *Attorney, Agent, or Firm* — NSIP Law

(57) ABSTRACT

An image sensor includes a plurality of pixels arranged in a predetermined aspect ratio to sense an image in an optical axis direction, wherein the predetermined aspect ratio is higher than 4/3 and lower than 16/9.

20 Claims, 13 Drawing Sheets

(56) References Cited

U.S. PATENT DOCUMENTS

| | | | |
|---|---|---|---|
| 11,418,695 B2* | 8/2022 | Miu | G06V 10/147 |
| 11,627,244 B1* | 4/2023 | Dhanda | H04N 23/57 |
| | | | 348/349 |
| 2005/0073618 A1* | 4/2005 | Hashimoto | G02F 1/1337 |
| | | | 349/5 |
| 2005/0227154 A1* | 10/2005 | Motoki | A61B 6/4283 |
| | | | 430/22 |
| 2006/0275025 A1* | 12/2006 | Labaziewicz | H04N 23/55 |
| | | | 348/E5.042 |
| 2007/0188636 A1 | 8/2007 | Augusto | |
| 2007/0263114 A1* | 11/2007 | Gurevich | H04N 23/54 |
| | | | 348/340 |
| 2009/0167896 A1* | 7/2009 | Nakayama | H04N 5/2628 |
| | | | 348/240.1 |
| 2009/0245770 A1* | 10/2009 | Uenaka | H04N 23/6812 |
| | | | 396/53 |
| 2009/0295932 A1* | 12/2009 | Ichii | H04N 23/667 |
| | | | 348/220.1 |
| 2010/0271530 A1* | 10/2010 | Ueda | H04N 23/667 |
| | | | 348/E5.022 |
| 2011/0242492 A1* | 10/2011 | Jung | G09F 9/33 |
| | | | 353/30 |
| 2011/0273540 A1* | 11/2011 | Lee | G06F 3/0346 |
| | | | 348/564 |
| 2012/0050578 A1 | 3/2012 | Aoki et al. | |
| 2014/0339668 A1 | 11/2014 | Arima et al. | |
| 2015/0029357 A1* | 1/2015 | Hamalainen | H04N 23/62 |
| | | | 348/223.1 |
| 2015/0326794 A1* | 11/2015 | Uemura | H04N 1/393 |
| | | | 348/240.99 |
| 2017/0177096 A1* | 6/2017 | Cheong | G06F 3/1454 |
| 2017/0307857 A1* | 10/2017 | Ning | G02B 9/64 |
| 2018/0007274 A1* | 1/2018 | Mogi | G02B 27/646 |
| 2018/0249126 A1* | 8/2018 | Lu | B60R 11/04 |
| 2019/0011679 A1* | 1/2019 | Sasaki | G06T 5/20 |
| 2019/0158748 A1* | 5/2019 | Maruhashi | H04N 23/651 |
| 2019/0182426 A1* | 6/2019 | Higashi | H04N 23/80 |
| 2019/0281221 A1* | 9/2019 | Kuwahara | H04N 5/265 |
| 2019/0302441 A1* | 10/2019 | Gaiduk | H04N 25/40 |
| 2020/0007766 A1* | 1/2020 | Haruna | H04N 23/815 |
| 2020/0065572 A1* | 2/2020 | Roberts | H04N 25/75 |
| 2020/0195837 A1* | 6/2020 | Miu | H04N 23/67 |
| 2020/0195906 A1* | 6/2020 | Van Hoff | H04N 13/296 |
| 2020/0326516 A1* | 10/2020 | Sasaki | G02B 27/0966 |
| 2020/0363609 A1* | 11/2020 | Bao | G02B 13/18 |
| 2020/0400425 A1* | 12/2020 | Woehler | G01B 11/026 |
| 2021/0116679 A1* | 4/2021 | Li | G02B 13/0035 |
| 2022/0146842 A1* | 5/2022 | Nagahara | G02B 15/14 |
| 2022/0196981 A1* | 6/2022 | Vlakhko | G02B 13/06 |
| 2022/0368885 A1* | 11/2022 | Cowley | H04N 25/771 |
| 2023/0108086 A1* | 4/2023 | Azoulai | G02B 13/02 |
| | | | 348/208.6 |
| 2023/0171882 A1* | 6/2023 | Kim | H05K 1/116 |
| | | | 348/208.7 |
| 2023/0236389 A1* | 7/2023 | Ho | G02B 13/0045 |
| | | | 359/708 |

FOREIGN PATENT DOCUMENTS

| | | |
|---|---|---|
| KR | 10-0494098 B1 | 6/2005 |
| KR | 10-2010-0112449 A | 10/2010 |
| KR | 10-2014-0128415 A | 11/2014 |
| WO | WO 2006/001615 A1 | 1/2006 |
| WO | WO 2010/117123 A2 | 10/2010 |

OTHER PUBLICATIONS

Stone, Strong "Lenovo Tab P11 Pro Tab M10 HD What's the Difference?" https://blog.naver.com/ksw_a/222139051458, Nov. 8, 2020, (4 pages in English and 4 pages in Korean).

Korean Office Action issued on Apr. 15, 2024, in counterpart Korean Patent Application No. 10-2022-0002128 (10 pages in English, 7 pages in Korean).

Taiwanese Office Action issued on May 11, 2023, in counterpart Taiwanese Patent Application No. 111122309 (5 pages in English, 5 pages in Chinese).

* cited by examiner

Variable Aspect Ratio MODE

IMAGE SENSOR, CAMERA MODULE, AND ELECTRONIC DEVICE INCLUDING THE SAME

CROSS-REFERENCE TO RELATED APPLICATIONS

This application claims the benefit under 35 USC 119(a) of Korean Patent Application Nos. 10-2021-0093417 filed on Jul. 16, 2021, and 10-2022-0002128 filed on Jan. 6, 2022, in the Korean Intellectual Property Office, the entire disclosures of which are incorporated herein by reference for all purposes.

BACKGROUND

1. Field

The present disclosure relates to an image sensor, a camera module, and an electronic device including the same.

2. Description of the Background

Electronic devices, such as smartphones, personal digital assistants, digital video cameras, digital still cameras, network systems, computers, monitors, tablet PCs, laptops, netbooks, televisions, video game machines, smart watches, and automobiles, may be produced in increasingly smaller sizes. For example, a length in an optical axis direction of a camera module or a lens module that may be included in such electronic devices may increasingly need to be shortened.

On the other hand, functions required for electronic devices have gradually been increasing. For example, an image sensed by a camera module and/or an image sensor that may be included in the electronic device may need to have a wider angle of view or more diverse angles of view.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image sensor includes a plurality of pixels arranged in a predetermined aspect ratio to sense an image in an optical axis direction, wherein the predetermined aspect ratio is higher than 4/3 and lower than 16/9.

The predetermined aspect ratio may be higher than 16/11.5 and lower than 16/9.5.

Each of the plurality of pixels may have a longitudinal length or a transverse length of larger than 0.5 µm and smaller than 0.9 µm, and DL may be larger than 8 mm and smaller than 14.4 mm, DL being a diagonal length from one corner between one longitudinal end and one transverse end to another corner between another longitudinal end and another transverse end of an area where the plurality of pixels are arranged.

Among the plurality of pixels, a pixel closest to a center of an area where the plurality of pixels are arranged may be in an active state, and among the plurality of pixels, a pixel closest to one corner of the area where the plurality of pixels are arranged may be in an inactive state.

A camera module may include the image sensor, and a lens module disposed on the plurality of pixels of the image sensor.

The camera module may further include a first actuator including a sensor substrate providing a space for disposing the image sensor thereon, wherein the first actuator may move the sensor substrate to change a positional relationship between the image sensor and the lens module.

The camera module may further include a second actuator moving the lens module to change a positional relationship between the image sensor and the lens module.

An electronic device may include the image sensor, an integrated circuit (IC) receiving the image sensed by the image sensor and generating information on a display screen based on the image, and a display member outputting the display screen.

The display member may output the display screen in an aspect ratio selected from a first aspect ratio lower than the predetermined aspect ratio of the image sensor and a second aspect ratio higher than the predetermined aspect ratio of the image sensor.

The display member may output the display screen in an aspect ratio selected from a plurality of different aspect ratios, and a difference between the plurality of different aspect ratios may be larger than a difference between an aspect ratio of the display member and an aspect ratio closest to the aspect ratio of the display member among the plurality of different aspect ratios.

The plurality of different aspect ratios for the display screen may include at least three of 4/3, 16/9, 20/9, and 21/9.

The electronic device may further include a lens module disposed on the image sensor, and a sensor substrate providing a space for disposing the image sensor thereon, wherein the display member may output the display screen in an aspect ratio selected from a plurality of different aspect ratios, and the IC may determine whether to use an optical image stabilization (OIS) mode for moving the lens module or the sensor substrate to stabilize the image sensed by the image sensor, and may determine whether to use at least some of the plurality of aspect ratios based on whether the OIS mode is used.

The IC may crop one longitudinal end area, another longitudinal end area, one transverse end area, and another transverse end area of the image sensed by the image sensor to process the image for electronic image stabilization (EIS), the display member may output the display screen in an aspect ratio selected from a plurality of different aspect ratios, and the one longitudinal end area, the other longitudinal end area, the one transverse end area, and the other transverse end area may be determined based on the selection from the plurality of aspect ratios.

In another general aspect, a camera module includes a sensor substrate providing a space for disposing an image sensor thereon, and a lens module disposed on the sensor substrate, wherein the lens module is disposed on the sensor substrate so that $\{2*\tan(\theta/2)*F\}$ is shorter than DL, $\theta$ being an angle of view of the lens module, F being a distance in an optical axis direction between the space in which the image sensor is disposed and the lens module in a state in which the lens module is focused, and DL being a diagonal length from one corner between one longitudinal end and one transverse end to another corner between another longitudinal end and another transverse end of the image sensor.

The camera module may further include a first actuator including the sensor substrate, wherein the first actuator may move the sensor substrate to change a positional relationship between the image sensor and the lens module.

The first actuator may move the sensor substrate in a direction perpendicular to the optical axis direction, and a maximum distance by which the first actuator moves the sensor substrate from the center may be defined as [{tan(θ/2)*F}−{tan{(θ/2)−B)*F}], where B may be 4 degrees or more and 7 degrees or less.

The camera module may further include a second actuator moving the lens module in the optical axis direction to focus the lens module.

The camera module may further include a second actuator moving the lens module to change a positional relationship between the image sensor and the lens module.

{2*tan(θ/2)*F} may be (16/1.85) mm or more and (16/1.3) mm or less.

{2*tan(θ/2)*F} may be shorter than DL in a state in which the lens module is focused so that the image sensor senses an image in an aspect ratio of 4/3 or 16/9.

In another general aspect, an image sensor includes a predetermined aspect ratio AR_S having a first area, wherein AR_S is greater than a first aspect ratio AR_1 having a second area and less than a second aspect ratio AR_2 having a third area, such that a sum of differences between the first area and the second area, and the first area and the third area is a minimum, and wherein AR_1 is 4/3 and AR_2 is in a range of 16/9 to 21/9.

A number of pixels arranged in the predetermined aspect ratio AR_S may be in a range of 116 million (M) to 120M.

A camera module may include the image sensor, and a lens module disposed on the image sensor, wherein an image focused on the image sensor through the lens module may include a horizontal angle of view of greater than 120 degrees, a vertical angle of view of greater than 90 degrees, and an optical distortion amount of less than 3%, and wherein a distance in an optical axis direction between the space in which the image sensor is disposed and the lens module may be 9 mm or less.

A number of pixels arranged in the predetermined aspect ratio AR_S may be in a range of 116M to 120M, and of the number of pixels, 100M or more may be arranged in the first aspect ratio AR_1 and 96M or less may be arranged in the second aspect ratio AR_2.

The camera module may further include a first actuator moving the image sensor in a direction perpendicular to the optical axis direction to change a positional relationship between the image sensor and the lens module.

The camera module may further include a second actuator moving the lens module in the optical axis direction to focus the lens module.

An electronic device may include the camera module, an integrated circuit (IC) receiving the image sensed by the image sensor and generating information on a display screen based on the image, and a display member outputting the display screen.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
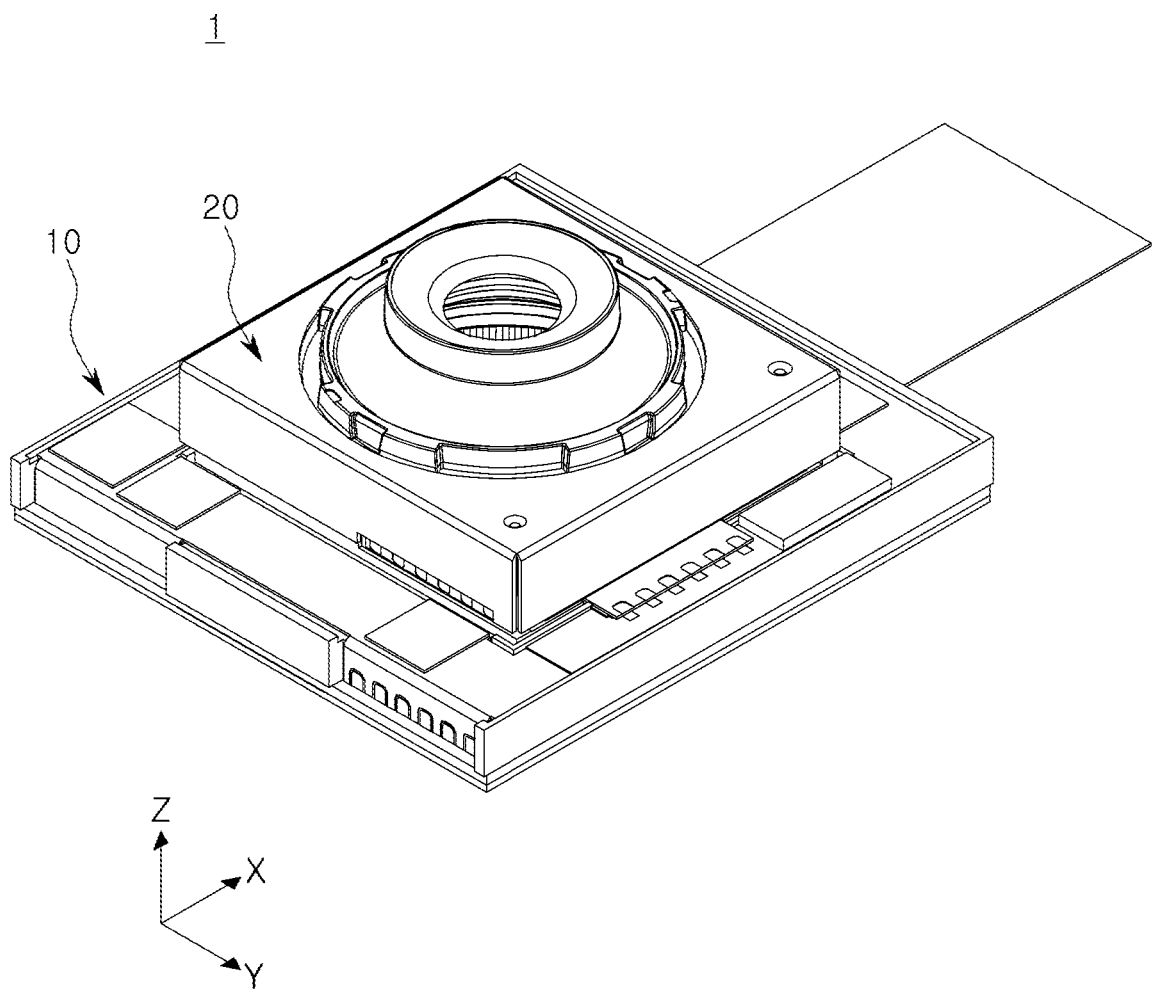
FIG. 1 is a perspective view of a camera module according to an example embodiment in the present disclosure.

Hereinafter, while example embodiments of the present disclosure will be described, for example, with reference to the accompanying drawings, it is noted that example embodiments are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

The present disclosure may provide an image sensor, a camera module, and an electronic device including the same.

Figure 2:
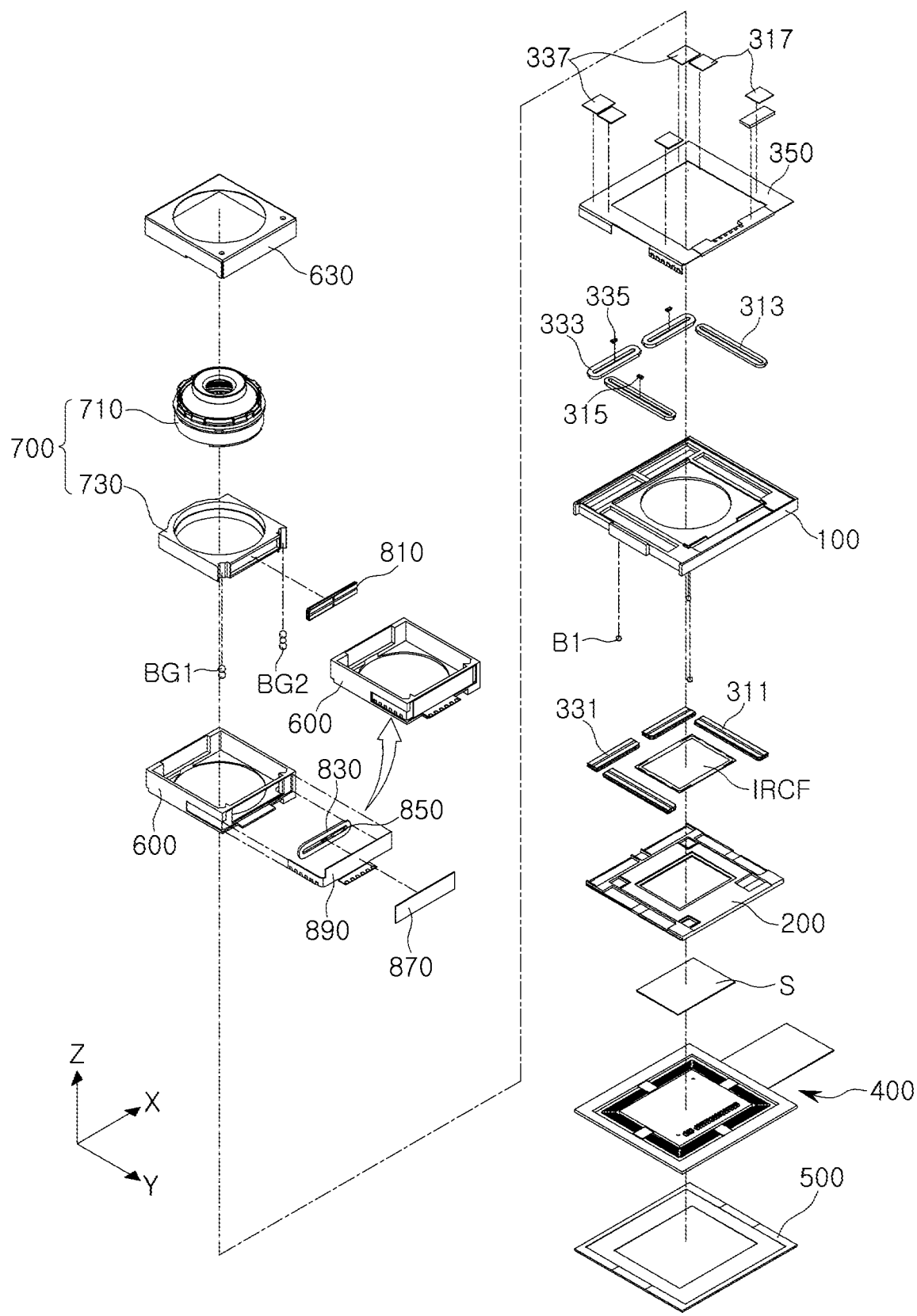
FIG. 2 is a schematic exploded perspective view of the camera module according to an example embodiment in the present disclosure.

FIG. 1 is a perspective view of a camera module according to an example embodiment in the present disclosure, and FIG. 2 is a schematic exploded perspective view of the camera module according to an example embodiment in the present disclosure.

Referring to FIGS. 1 and 2, a camera module 1 according to an example embodiment in the present disclosure may include an image sensor S according to an example embodiment in the present disclosure, and may further include a lens module 700 and at least one of a first actuator 10 and a second actuator 20.

The first actuator 10 may be an actuator for image stabilization, and the second actuator 20 may be an actuator for focusing, but the first actuator 10 and the second actuator 20 are not limited thereto. As an example, the first actuator 10 may be provided for image stabilization and/or focusing, and the second actuator 20 may be omitted. As another example, the second actuator 20 may be provided for image stabilization and/or focusing, and the first actuator 10 may be omitted.

The lens module 700 may include one or more lenses and a lens barrel 710. One or more lenses may be disposed inside the lens barrel 710. When the number of the one or more lenses is two or more, the plurality of lenses may be mounted inside the lens barrel 710 along an optical axis (Z-axis).

For example, the lens module 700 may further include a carrier 730 coupled to the lens barrel 710. A hollow portion penetrating through the carrier 730 in the optical axis (Z-axis) direction may be provided in the carrier 730, and the lens barrel 710 may be inserted into the hollow portion and disposed to be fixed to the carrier 730.

For autofocusing (AF), the first actuator 10 and/or the second actuator 20 may move the lens module 700 in the optical axis (Z-axis) direction, and the lens module 700 may adjust a focus.

For optical image stabilization (OIS), the first actuator 10 and/or the second actuator 20 may move the lens module 700 in a direction perpendicular to the optical axis (Z-axis) direction (e.g. an X-axis direction and/or a Y-axis direction), the lens module 700 may be moved within the camera module 1 in a direction to offset movement caused by force generated outside the camera module 1, and the image sensor S may reduce an influence of the force generated outside the camera module 1 on an image in the process of acquiring the image through the lens module 700.

Referring to FIGS. 1 and 2, the first actuator 10 may include at least one of a fixed frame 100, a movable frame 200, a first driving unit, a sensor substrate 400, and a base 500. The first driving unit may include first and second sub driving units. The first sub driving unit may include at least one of a first magnet member 311, a first coil member 313, and a first position sensor member 315, and the second sub driving unit may include at least one of a second magnet member 331, a second coil member 333, and a second position sensor member 335.

The fixed frame 100 may be coupled to the second actuator 20 to be described later. For example, the fixed frame 100 may be coupled to a housing 600 of the second actuator 20. A seating groove may be provided in an upper surface of the fixed frame 100 to allow the housing 600 of the second actuator 20 to be seated on the upper surface of the fixed frame 100.

The fixed frame 100 may be a fixed member that does not move during focusing and image stabilization, and may have a rectangular box shape with upper and lower sides thereof being open, but is not limited thereto.

The movable frame 200 may be accommodated in the fixed frame 100. The fixed frame 100 has a sidewall extending downwardly in the optical axis (Z-axis) direction, and accordingly, the fixed frame 100 may have an accommodation space for accommodating the movable frame 200.

The movable frame 200 may be moved relative to the fixed frame 100 in a direction perpendicular to the optical axis (Z-axis), or may be rotated about the optical axis (Z-axis) as a rotation axis. That is, the movable frame 200 may be a movable member that is moved for image stabilization. For example, the movable frame 200 is configured to be movable in a first axis (X-axis) direction and a second axis (Y-axis) direction, and may be rotated about the optical axis (Z-axis) as a rotation axis. The first axis (X-axis) direction may refer to a direction perpendicular to the optical axis (Z-axis), and the second axis (Y-axis) direction may refer to a direction perpendicular to both the optical axis (Z-axis) direction and the first axis (X-axis) direction. The movable frame 200 may have a rectangular plate shape with a hollow portion penetrating through the center thereof in the optical axis (Z-axis) direction, but is not limited thereto.

An infrared cutoff filter (IRCF) may be mounted on an upper surface of the movable frame 200. A filter mounting groove may be provided in the upper surface of the movable frame 200 to allow the infrared cutoff filter (IRCF) to be mounted on the upper surface of the movable frame 200. The sensor substrate 400 may be mounted on a lower surface of the movable frame 200.

A first ball member B1 may be disposed between the fixed frame 100 and the movable frame 200. The first ball member B1 may be disposed to contact each of the fixed frame 100 and the movable frame 200. When the movable frame 200 is moved or rotated relative to the fixed frame 100, the first ball member B1 may roll between the fixed frame 100 and the movable frame 200 to support the movement of the movable frame 200. For example, in order to reinforce the rigidity of the movable frame 200, a reinforcing plate of a stainless material may be provided in the movable frame 200.

The image sensor S may be mounted on the sensor substrate 400. A partial portion of the sensor substrate 400 may be coupled to the movable frame 200, and another portion of the sensor substrate 400 may be coupled to the fixed frame 100. The image sensor S may be mounted on the partial portion of the sensor substrate 400 coupled to the movable frame 200.

For example, since the partial portion of the sensor substrate 400 is coupled to the movable frame 200, when the movable frame 200 is moved or rotated, the partial portion of the sensor substrate 400 may also be moved or rotated together with the movable frame 200. Accordingly, the image sensor S may be moved or rotated on a plane perpendicular to the optical axis (Z-axis) for image stabilization during capturing an image.

For example, the sensor substrate 400 may be a rigid-flexible printed circuit board. For example, the image sensor S may be disposed on a rigid portion of the rigid-flexible printed circuit board, and a flexible portion of the rigid-flexible printed circuit board may be electrically connected to the first driving unit to be described later, or electrically connected to a target (e.g., an integrated circuit (IC) or a processor) to which the image obtained by the image sensor S is to be transmitted. For example, the base 500 may be coupled to a lower side of the sensor substrate 400 to prevent the inflow of foreign matters or the like from the outside.

The first driving unit may generate driving force in a direction perpendicular to the optical axis (Z-axis) to move the movable frame 200 in the direction perpendicular to the optical axis (Z-axis) or to rotate the movable frame 200 about the optical axis (Z-axis) as a rotation axis. The first sub driving unit of the first driving unit may generate driving force in the first axis (X-axis) direction, and the second sub driving unit of the first driving unit may generate driving force in the second axis (Y-axis) direction.

The first magnet member 311 and the first coil member 313 of the first sub driving unit may be disposed to face each other in the optical axis (Z-axis) direction. The first magnet member 311 may be disposed on the movable frame 200. The first magnet member 311 may include a plurality of magnets. For example, the first magnet member 311 may include two magnets, and the two magnets may be symmetrically spaced apart from each other with respect to the optical axis (Z-axis). For example, the first magnet member 311 may include two magnets spaced apart from each other in a direction (the first axis (X-axis) direction) in which the driving force is generated by the first magnet member 311. For example, a mounting groove may be provided in the upper surface of the movable frame 200 to mount the first magnet member 311 on the upper surface of the movable frame 200.

The first magnet member 311 may be magnetized so that one surface thereof (e.g., a surface facing the first coil member 313) has both an N pole and an S pole. As an example, an N pole, a neutral region, and an S pole may be sequentially provided in the first axis (X-axis) direction on one surface of the first magnet member 311 facing the first coil member 313. The first magnet member 311 may have a shape to have a length in the second axis (Y-axis) direction. Also, another surface (e.g., an opposite surface of the one surface) of the first magnet member 311 may be magnetized to have both an S pole and an N pole. As an example, an S pole, a neutral region, and an N pole may be sequentially provided in the first axis (X-axis) direction on the other surface of the first magnet member 311.

The first coil member 313 may be disposed to face the first magnet member 311. For example, the first coil member 313 may be disposed to face the first magnet member 311 in the optical axis (Z-axis) direction. The first coil member 313 may have a donut shape with a hollow, and may have a shape to have a length in the second axis (Y-axis) direction. The first coil member 313 may include coils in a number corresponding to the number of magnets included in the first magnet member 311.

The first coil member 313 may be disposed on a first substrate 350. The first substrate 350 may be mounted on the fixed frame 100 so that the first magnet member 311 and the first coil member 313 face the first substrate 350 in the optical axis (Z-axis) direction. The fixed frame 100 may have a through-hole, for example, corresponding to the first coil member 313. For example, the through-hole may be configured to penetrate through the upper surface of the fixed frame 100 in the optical axis (Z-axis) direction, and an upper side of the through-hole may be covered by the first substrate 350, and the first coil member 313 may be disposed in the through-hole of the fixed frame 100.

The first magnet member 311 may be a movable member mounted on the movable frame 200 to move together with the movable frame 200, and the first coil member 313 may be a fixed member fixed to the first substrate 350 and the fixed frame 100. When power is applied to the first coil member 313, the movable frame 200 may be moved in the first axis (X-axis) direction by an electromagnetic force between the first magnet member 311 and the first coil member 313. The first magnet member 311 and the first coil member 313 may generate driving force in a direction (e.g., the first axis (X-axis) direction) perpendicular to a direction (the optical axis direction) in which the first magnet member 311 and the first coil member 313 face each other.

The second magnet member 331 and the second coil member 333 of the second sub driving unit may be disposed to face each other in the optical axis (Z-axis) direction. The second magnet member 331 may be disposed on the movable frame 200. The second magnet member 331 may include a plurality of magnets. For example, the second magnet member 331 may include two magnets, and the two magnets may be spaced apart from each other in the first axis (X-axis) direction. For example, the second magnet member 331 may include two magnets spaced apart from each other in a direction perpendicular to a direction (the second axis (Y-axis) direction) in which the driving force is generated by the second magnet member 331.

For another design, the first magnet member 311 and the second magnet member 331 may be disposed in reverse with respect to the shape illustrated in FIG. 2. For example, the first magnet member 311 may include two magnets spaced apart from each other in a direction perpendicular to the direction (the first axis (X-axis) direction) in which the driving force is generated by the first magnet member 311, and the second magnet member 331 may include two magnets spaced apart from each other in the direction (the second axis (Y-axis) direction) in which the driving force is generated by the second magnet member 331. Alternatively, both the first magnet member 311 and the second magnet member 331 may include two magnets spaced apart from each other in a direction perpendicular to the direction in which the driving force is generated by each of the magnets. A mounting groove may be provided in the upper surface of the movable frame 200 to dispose the second magnet member 331 therein.

The second magnet member 331 may be magnetized so that one surface thereof (e.g., a surface facing the second coil member 333) has both an S pole and an N pole. For example, an S pole, a neutral region, and an N pole may be sequentially provided in the second axis (Y-axis) direction on one surface of the second magnet member 331 facing the second coil member 333. The second magnet member 331 may have a shape to have a length in the first axis (X-axis) direction. Another surface (e.g., an opposite surface of the one surface) of the second magnet member 331 may be magnetized to have both an N pole and an S pole. For example, an S pole, a neutral region, and an N pole may be sequentially provided in the second axis (Y-axis) direction on the other surface of the second magnet member 331.

The second coil member 333 may be disposed to face the second magnet member 331. For example, the second coil member 333 may be disposed to face the second magnet member 331 in the optical axis (Z-axis) direction. The second coil member 333 may have a donut shape with a hollow, and may have a shape to have a length in the first axis (X-axis) direction. The second coil member 333 may include coils in a number corresponding to the number of magnets included in the second magnet member 331.

The second coil member 333 may be disposed on the first substrate 350. The first substrate 350 may be mounted on the fixed frame 100 so that the second magnet member 331 and the second coil member 333 face the first substrate 350 in the optical axis (Z-axis) direction. The fixed frame 100 may have a through-hole, for example, corresponding to the second coil member 333. For example, the through-hole may be configured to penetrate through the upper surface of the fixed frame 100 in the optical axis direction, and the second coil member 333 may be disposed in the through-hole of the fixed frame 100.

The second magnet member 331 may be a movable member mounted on the movable frame 200 to move together with the movable frame 200, and the second coil member 333 may be a fixed member fixed to the first substrate 350 and the fixed frame 100. When power is applied to the second coil member 333, the movable frame 200 may be moved in the second axis (Y-axis) direction by an electromagnetic force between the second magnet member 331 and the second coil member 333. The second magnet member 331 and the second coil member 333 may generate driving force in a direction (e.g., the second axis (Y-axis) direction) perpendicular to a direction (the optical axis direction) in which the second magnet member 331 and the second coil member 333 face each other.

Meanwhile, the movable frame 200 may be rotated with respect to the optical axis (Z-axis) by the first and second magnets 311 and 331 and the first and second coils 313 and 333.

The first ball member B1 may be disposed between the fixed frame 100 and the movable frame 200. The first ball member B1 may be disposed to contact each of the fixed frame 100 and the movable frame 200. The first ball member B1 may guide the movement of the movable frame 200 in a process of image stabilization, and may also maintain a gap between the fixed frame 100 and the movable frame 200.

When driving force is generated in the first axis (X-axis) direction, the first ball member B1 may roll in the first axis (X-axis) direction. Accordingly, the first ball member B1 may guide the movement of the movable frame 200 in the first axis (X-axis) direction. Also, when driving force is generated in the second axis (Y-axis) direction, the first ball member B1 may roll in the second axis (Y-axis) direction. Accordingly, the first ball member B1 may guide the movement of the movable frame 200 in the second axis (Y-axis) direction. The first ball member B1 may include a plurality of balls disposed between the fixed frame 100 and the movable frame 200.

A guide groove may be provided in at least one of the surfaces of the fixed frame 100 and the movable frame 200 facing each other in the optical axis (Z-axis) direction to dispose the first ball member B1 therein. A plurality of guide grooves may be provided to correspond to the plurality of balls of the first ball member B1. For example, a first guide groove may be provided in the lower surface of the fixed frame 100 and a second guide groove may be provided in the upper surface of the movable frame 200. A plurality of first guide grooves may be provided to correspond to the plurality of balls of the first ball member B1. A plurality of second guide grooves may be provided to correspond to the plurality of first guide grooves and/or the plurality of balls of the first ball member B1. The balls of the first ball member B1 may be disposed in the first guide groove and the second guide groove, respectively, to be fitted between the fixed frame 100 and the movable frame 200.

The first position sensor member 315 may be disposed on the first substrate 350 to face the first magnet member 311, and the second position sensor member 335 may be disposed on the first substrate 350 to face the second magnet member 331. For example, the first position sensor member 315 and the second position sensor member 335 may be hall sensors. For example, the second position sensor member 335 may include two hall sensors. For example, the second magnet member 331 may include two magnets spaced apart from each other in a direction (the first axis (X-axis) direction) perpendicular to the direction (the second axis (Y-axis) direction) in which the driving force is generated by the second magnet member 331, and the second position sensor member 335 may include two hall sensors disposed to face the two magnets, respectively. The two hall sensors facing the second magnet member 331 may detect whether or not the movable frame 200 is rotated.

Referring to FIGS. 1 and 2, the first actuator 10 may include a first yoke member 317 and a second yoke member 337. The first yoke member 317 and the second yoke member 337 may provide an attractive force to keep the fixed frame 100 and the movable frame 200 in contact with the first ball member B1.

The first yoke member 317 and the second yoke member 337 may be disposed in the fixed frame 100. For example, the first yoke member 317 and the second yoke member 337 may be disposed on the first substrate 350, and the first substrate 350 may be coupled to the fixed frame 100. The first coil member 313 and the second coil member 333 may be disposed on one surface of the first substrate 350, and the first yoke member 317 and the second yoke member 337 may be disposed on the other surface of the first substrate 350. For example, the first yoke member 317 and the second yoke member 337 may be made of a material capable of generating an attractive force between the first magnet member 311 and the second magnet member 331. As an example, the first yoke member 317 and the second yoke member 337 may be provided using a magnetic material.

The first yoke member 317 may be disposed to face the first magnet member 311 in the optical axis (Z-axis) direction. The first yoke member 317 may include a plurality of yokes corresponding to two times as many as the number of magnets included in the first magnet member 311. For example, each of the magnets in the first magnet member 311 may face two yokes in the optical axis (Z-axis) direction. The two yokes facing one magnet may be spaced apart from each other in the second axis (Y-axis) direction. However, the first yoke member 317 may include a plurality of yokes corresponding to the number of magnets included in the first magnet member 311.

The second yoke member 337 may be disposed to face the second magnet member 331 in the optical axis (Z-axis) direction. The second yoke member 337 may include a plurality of yokes corresponding to the number of magnets included in the second magnet member 331. For example, when the second magnet member 331 includes two magnets, the second yoke member 337 may include two yokes. The two yokes may be spaced apart from each other in the first axis (X-axis) direction. Alternatively, each of the magnets in the second magnet member 331 may face two yokes in the optical axis direction. In this case, the two yokes facing one magnet may be spaced apart from each other in the first axis (X-axis) direction.

Referring to FIGS. 1 and 2, the second actuator 20 may include at least one of a case 630, a carrier 730, a housing 600, and a second driving unit. The second driving unit may include at least one of a third magnet member 810, a third coil member 830, a third position sensor member 850, a third yoke member 870, and a second substrate 890.

The carrier 730 may have a hollow portion penetrating through the carrier 730 in the optical axis (Z-axis) direction, the lens barrel 710 may be inserted into the hollow portion and disposed to be fixed to the carrier 730. Accordingly, the lens barrel 710 may be moved together with the carrier 730 in the optical axis (Z-axis) direction.

The housing 600 has an internal space, and may have a rectangular box shape with upper and lower sides thereof being open. The carrier 730 may be disposed in the internal space of the housing 600. The case 630 may be coupled to the housing 600 to protect components inside the second actuator 20.

The third magnet member 810 and the third coil member 830 of the second driving unit 800 may generate driving force in the optical axis (Z-axis) direction to move the carrier 730 in the optical axis (Z-axis) direction. The third magnet member 810 and the third coil member 830 may be disposed to face each other in a direction perpendicular to the optical axis (Z-axis).

The third magnet member 810 may be disposed on the carrier 730. For example, the third magnet member 810 may be disposed on one side surface of the carrier 730. A back yoke may be disposed between the carrier 730 and the third magnet member 810. The third magnet member 810 may be magnetized so that one surface thereof (e.g., a surface facing the third coil member 830) has both an N pole and an S pole. As an example, an N pole, a neutral region, and an S pole may be sequentially provided along the optical axis (Z-axis) direction on one surface of the third magnet member 810 facing the third coil member 830. Another surface (e.g., an opposite surface of the one surface) of the third magnet member 810 may be magnetized to have both an N pole and an S pole. As an example, an N pole, a neutral region, and an S pole may be sequentially provided along the optical axis (Z-axis) direction on the other surface of the third magnet member 810.

The third coil member 830 may be disposed to face the third magnet member 810. For example, the third coil member 830 may be disposed to face the third magnet member 810 in a direction perpendicular to the optical axis (Z-axis). The third coil member 830 may be disposed on the second substrate 890, and the second substrate 890 may be mounted on the housing 600 so that the third magnet member 810 and the third coil member 830 face the second substrate 890 in a direction perpendicular to the optical axis (Z-axis).

The third magnet member 810 may be a movable member mounted on the carrier 730 to move together with the carrier 730 in the optical axis (Z-axis) direction, and the third coil member 830 may be a fixed member fixed to the second substrate 890. When power is applied to the third coil member 830, the carrier 730 may be moved in the optical axis (Z-axis) direction by an electromagnetic force between the third magnet member 810 and the third coil member 830. Since the lens barrel 710 is disposed on the carrier 730, the lens barrel 710 may also be moved in the optical axis (Z-axis) direction according to the movement of the carrier 730.

The third yoke member 870 may be disposed on the housing 600. The third yoke member 870 may be disposed at a position facing the third magnet member 810. For example, the third coil member 830 may be disposed on one surface of the second substrate 890, and the third yoke member 870 may be disposed on the other surface of the second substrate 890. The third magnet member 810 and the third yoke member 870 may generate an attractive force therebetween. For example, the attractive force may act between the third magnet member 810 and the third yoke member 870 in a direction perpendicular to the optical axis (Z-axis).

Guide grooves may be disposed in the surfaces of the carrier 730 and the housing 600 facing each other. For example, a third guide groove may be provided in the carrier 730, and a fourth guide groove may be provided in the housing 600. A plurality of third guide grooves may be provided in the carrier 730 and a plurality of fourth guide grooves may be provided in the housing 600 to correspond to the plurality of third guide grooves. A first ball group BG1 and a second ball group BG2 may be disposed in the third and fourth guide grooves, and each of the first ball group BG1 and the second ball group BG2 may include a plurality of balls.

The third position sensor member 850 may be disposed on the second substrate 890 to face the third magnet member 810. For example, the third position sensor member 850 may be a hall sensor.

Figure 3:
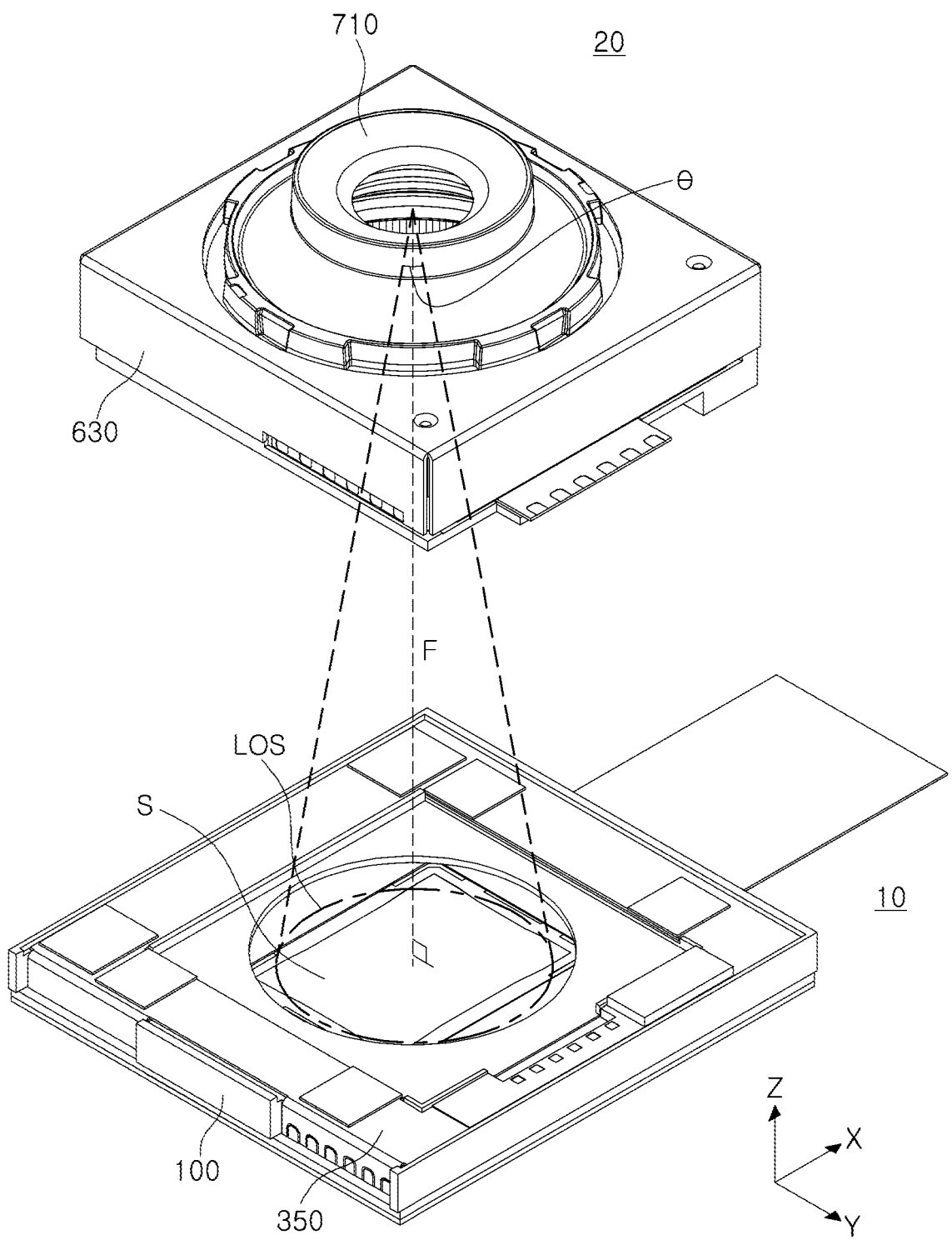
FIG. 3 is a perspective view illustrating an image sensor and a lens optical size (LOS) of the camera module according to an example embodiment in the present disclosure.
Figure 4:
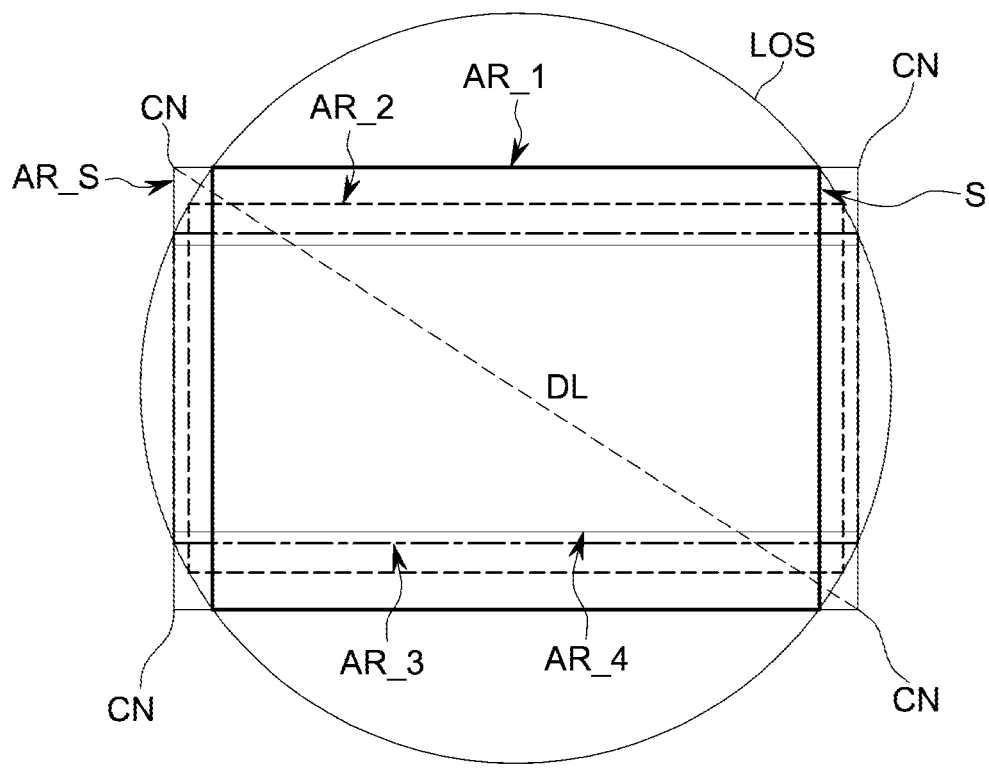
FIG. 4 is a plan view illustrating various aspect ratios for an image that may be acquired by the image sensor within the lens optical size according to an example embodiment in the present disclosure.

FIG. 3 is a perspective view illustrating the image sensor and a lens optical size (LOS) of the camera module according to an example embodiment in the present disclosure, and FIG. 4 is a plan view illustrating various aspect ratios for an image that may be acquired by the image sensor within the lens optical size according to an example embodiment in the present disclosure.

Referring to FIGS. 1 through 4, the image sensor S according to an example embodiment in the present disclosure may be disposed in a space provided in the sensor substrate 400 of the first actuator 10. The lens module 700 of the second actuator 20 may be disposed on the image sensor S, and may be disposed on the sensor substrate 400. The camera module 1 according to an example embodiment in the present disclosure may include a sensor substrate 400 and a lens module 700.

An angle of view of the lens module 700 may be defined as θ. A distance in the optical axis direction between the space in which the image sensor S is disposed and the lens module 700 in a state in which the lens module 700 is focused may be defined as F. A radius of the lens optical size (LOS) may be calculated as $\{\tan(\theta/2)*F\}$, and a diameter of the lens optical size (LOS) may be calculated as $\{2*\tan(\theta/2)*F\}$.

Figure 8:
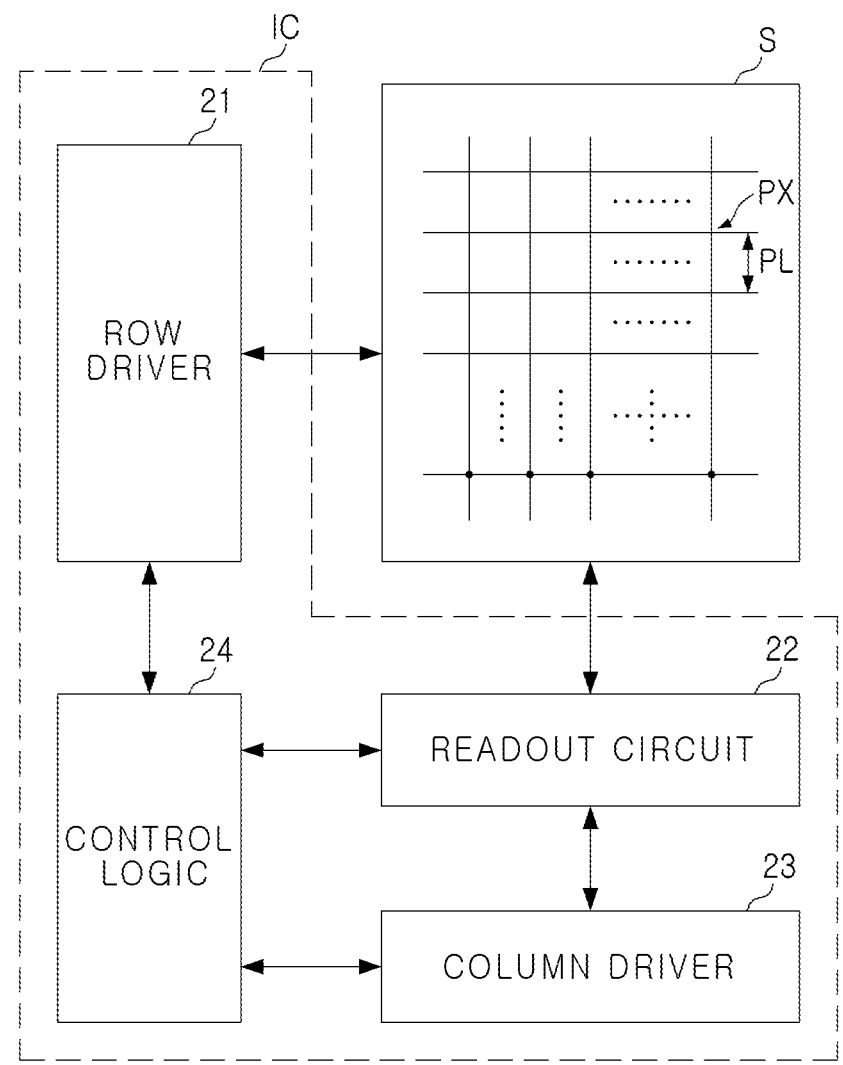
FIG. 8 is a block diagram schematically illustrating the image sensor according to an example embodiment in the present disclosure.

The image sensor S may include a plurality of pixels arranged at a predetermined aspect ratio AR_S to sense an image in the optical axis (Z-axis) direction (see FIG. 8). The image sensed by the image sensor S may be limited to have a size within the lens optical size (LOS). Therefore, an increase in lens optical size (LOS) may increase a size or an angle of view of an image sensed by the image sensor S, and increase a degree of freedom in selecting an aspect ratio of the image sensed by the image sensor S. Furthermore, the increase in lens optical size (LOS) may also increase a size or an angle of view of a display screen of an electronic device using the image sensor S, and increase a degree of freedom in selecting an aspect ratio of the display screen.

The lens optical size LOS may increase as the angle θ of view or the distance F increases. Therefore, when a Z-direction length of the lens module 700 increases or an overall Z-direction length of the camera module 1 increases, the lens optical size LOS may increase.

The Z-direction length of the lens module 700 or the overall Z-direction length of the camera module 1 may be limited according to a standard required for the camera module 1 or a standard required for the electronic device using the image sensor S. In this case, the maximum size of the lens optical size LOS may also be limited.

Therefore, the lens module 700 of the camera module 1 according to an example embodiment in the present disclosure may be disposed on the sensor substrate 400 so that $\{2*\tan(\theta/2)*F\}$ is shorter than DL which is a diagonal length from one corner between one longitudinal end and one transverse end of the image sensor S to another corner between another longitudinal end and another transverse end of the image sensor S.

Alternatively, the predetermined aspect ratio AR_S of the image sensor S may be higher than a first aspect ratio AR_1 and lower than a second aspect ratio AR_2. Here, the first aspect ratio AR_1 may be 4/3, and the second aspect ratio AR_2 may be 16/9. For example, the lens module 700 may be in a focused state so that the image sensor S senses images in the first aspect ratio AR_1 and/or in the second aspect ratio AR_2, and $\{2*\tan(\theta/2)*F\}$ may be smaller than the length DL.

An aspect ratio of an image to be obtained by the electronic device using the image sensor S may be highly likely to be 4/3 or 16/9. As an example, when the aspect ratio of the image to be obtained by the electronic device is the first aspect ratio AR_1, an area of the image acquired by the image sensor S may be an area where one longitudinal end area and the other longitudinal end area are excluded with respect to the entire area of the image sensor S. As another example, when the aspect ratio of the image to be obtained by the electronic device is the second aspect ratio AR_2, an area of the image acquired by the image sensor S may be an area in which one transverse end area and the other transverse end area are excluded with respect to the entire area of the image sensor S.

Here, a sum of a total area of the areas excluded to obtain the image in the first aspect ratio AR_1 and a total area of the areas excluded to obtain the image in the second aspect ratio AR_2 may be smaller when the predetermined aspect ratio AR_S of the image sensor S is higher than the first aspect ratio AR_1 and lower than the second aspect ratio AR_2 than when the predetermined aspect ratio AR_S of the image sensor S is the first aspect ratio AR_1 or the second aspect ratio AR_2.

Therefore, the image sensor S according to an example embodiment in the present disclosure is capable of effectively increasing an overall area of an image in both the first and second aspect ratios AR_1 and AR_2, and preventing an image in one of the first and second aspect ratios AR_1 and AR_2 from being too small.

Corners CN of the image sensor S may belong to both the areas excluded to obtain the image in the first aspect ratio AR_1 and the areas excluded to obtain the image in the second aspect ratio AR_2. Thus, it may not be required that the corners CN of the image sensor S be located within the lens optical size LOS, making it possible to reduce the Z-direction length of the lens module 700 or the overall Z-direction length of the camera module 1.

For example, pixels closest to the corners CN of the image sensor S may not be necessary for image sensing, and thus be in an inactive state. On the other hand, pixels closest to the center of the image sensor S may be used for image sensing, and thus be in an active state. Since the pixels in the inactive state consume less power, the image sensor S may reduce overall power consumption through the pixels in the inactive state. For example, the inactivation of the pixels may refer to lowering a power voltage supplied to the pixels (see FIGS. 9A and 9B), and the activation of the pixels may refer to normally supplying a power voltage to the pixels.

For example, the predetermined aspect ratio AR_S may be higher than 16/11.5 and lower than 16/9.5. For example, the predetermined aspect ratio AR_S may be 16/10 or 16/11.

For example, the image sensor S may sense images in a third aspect ratio AR_3 and/or a fourth aspect ratio AR_4. The third aspect ratio AR_3 may be 20/9, and the fourth aspect ratio AR_4 may be 21/9. The third and fourth aspect ratios AR_3 and AR_4 may be higher than the predetermined aspect ratio AR_S. Since the third and fourth aspect ratios AR_3 and AR_4 are higher than the second aspect ratio AR_2, images in the third and fourth aspect ratios AR_3 and AR_4 may have a considerably wide horizontal angle of view.

The lens optical size (LOS) may be circular, and the predetermined aspect ratio AR_S higher than 16/11.5 and lower than 16/9.5 may be any of the first, second, third and fourth aspect ratios AR_1, AR_2, AR_3, and AR_4, in which an image may be efficiently provided within the lens optical size (LOS).

Table 1 below shows parameters in six examples of the image sensor S according to an example embodiment in the present disclosure. The six examples may provide images each having a horizontal angle of view of larger than 120 degrees, a vertical angle of view of larger than 90 degrees, and an optical distortion amount of smaller than 3%, while satisfying the requirement that the Z-direction length of the lens module 700 be smaller than 9 mm as a standard.

TABLE 1

| No. | The number of pixels | Aspect ratio | The number of horizontal pixels | The number of vertical pixels | Pixel size | DL (mm) | $\{2 * \tan(\theta/2) * F\}$ (mm) |
|---|---|---|---|---|---|---|---|
| 1 | 116M | 16/10 | 13334 | 8664 | 0.8 μm | 12.721 | 16/1.37 |
| 2 | 120M | 16/11 | 13334 | 9000 | 0.8 μm | 12.870 | 16/1.33 |
| 3 | 116M | 16/10 | 13334 | 8664 | 0.7 μm | 11.131 | 16/1.56 |
| 4 | 120M | 16/11 | 13334 | 9000 | 0.7 μm | 11.261 | 16/1.52 |
| 5 | 116M | 16/10 | 13334 | 8664 | 0.6 μm | 9.541 | 16/1.82 |
| 6 | 120M | 16/11 | 13334 | 9000 | 0.6 μm | 9.652 | 16/1.78 |

The number of pixels (e.g., 116 million (M) or 120M) in Table 1 may be set to stably secure a frame rate of 24 fps or more when the image sensor S provides a video image, but is not limited thereto. The number of pixels in Table 1 may be a product of the number of horizontal pixels and the number of vertical pixels. For example, when the number of pixels of the image sensor S is 116M, the number of pixels used for an image in the first aspect ratio AR_1 may be 100M, the number of pixels used for an image in the second aspect ratio AR_2 may be 92M, the number of pixels used for an image in the third aspect ratio AR_3 may be 80M, and the number of pixels used for an image in the fourth aspect ratio AR_4 may be 76M. For example, the structure of the plurality of pixels in the six examples of Table 1 may be a 2*2 tetra color filter array structure.

For example, referring to Table 1, the length DL from one corner between one longitudinal end and one transverse end of the image sensor S to the other corner between the other longitudinal end and the other transverse end of the image sensor S according to an example embodiment in the present disclosure may be larger than 8 mm and smaller than 14.4 mm.

For example, referring to Table 1, a longitudinal length or a transverse length of each of the plurality of pixels of the image sensor S according to an example embodiment in the present disclosure may be larger than 0.5 μm (microns) and smaller than 0.9 μm.

For example, referring to Table 1, $\{2*\tan(\theta/2)*F\}$ of the camera module 1 according to an example embodiment in the present disclosure may be (16/1.85) mm or more and (16/1.3) mm or less.

Figure 5:
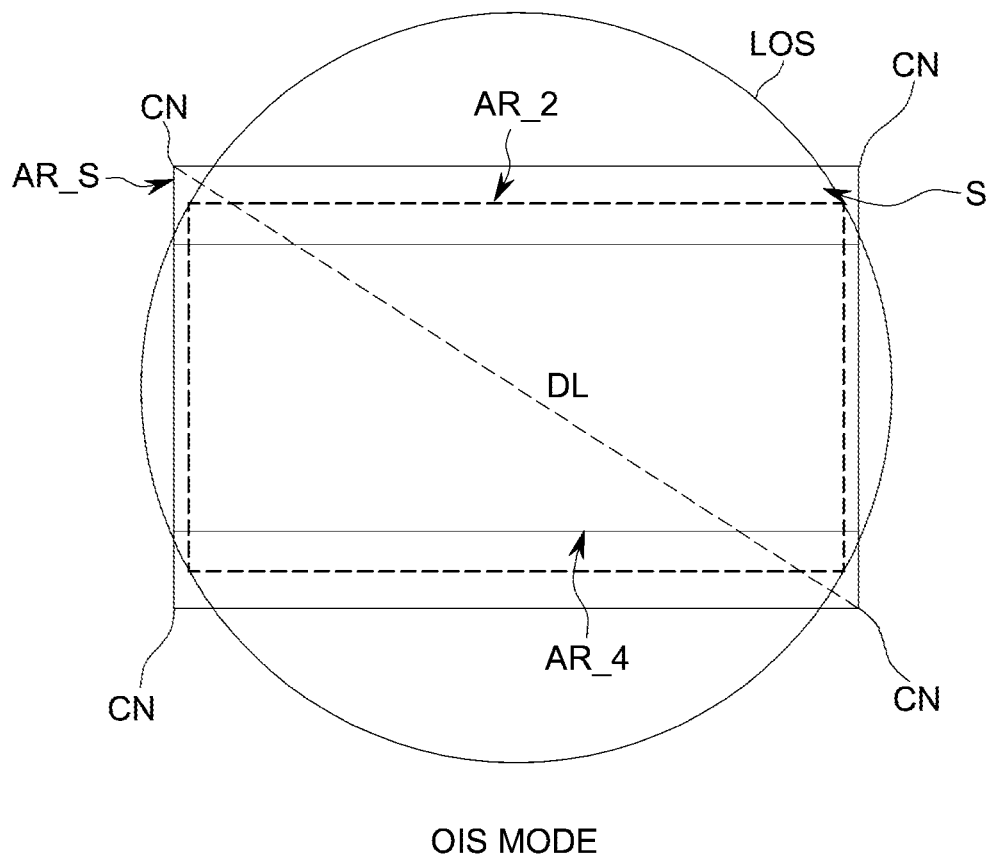
FIG. 5 is a plan view illustrating aspect ratios that may be selected for optical image stabilization (OIS) among the various aspect ratios of FIG. 4.

FIG. 5 is a plan view illustrating aspect ratios that may be selected for optical image stabilization (OIS) among the various aspect ratios of FIG. 4.

Referring to FIG. 5, in an optical image stabilization (OIS) mode, the second and fourth aspect ratios AR_2 and AR_4 may be used, without using the first and third aspect ratios AR_1 and AR_3 of FIG. 4. Whether to use the first and third aspect ratios AR_1 and AR_3 may vary depending on whether OIS is used. The aspect ratio varying depending on whether OIS is used may vary depending on design.

For example, since one longitudinal end area, the other longitudinal end area, one transverse end area, and the other transverse end area of the image sensor S are not used in sensing an image in the second aspect ratio AR_2, a margin of the image in the second aspect ratio AR_2 for OIS may be larger or more balanced than those in the other aspect ratios. Accordingly, the image in the second aspect ratio AR_2 may be more stably obtained through OIS.

For example, since an image in the fourth aspect ratio AR_4 has a widest horizontal angle of view, the image in the fourth aspect ratio AR_4 is highly likely to be more optimized as compared to images in the other aspect ratios, and the high optimization of the image in the fourth aspect ratio AR_4 may be efficient for OIS. Therefore, the image in the fourth aspect ratio AR_4 may also be more stably acquired through OIS.

For example, a considerably wide horizontal angle of view, such as the fourth aspect ratio AR 4, may require a longer maximum distance by which the sensor substrate 400 or the lens module 700 is movable for OIS than a common horizontal angle of view. For example, each of a horizontal OIS correction angle and a vertical OIS correction angle may be 3 degrees or more and 5 degrees or less, and a diagonal OIS correction angle may be 4 degrees or more and 7 degrees or less.

For example, when the maximum distance by which the sensor substrate 400 or the lens module 700 is movable from a point corresponding to the center of the lens optical size (LOS) for OIS is defined as $[\{\tan(\theta/2)*F\}-\{\tan((\theta/2)-B)*F\}]$, B is a diagonal OIS correction angle. Accordingly, B may be 4 degrees or more and 7 degrees or less.

Figure 6A:
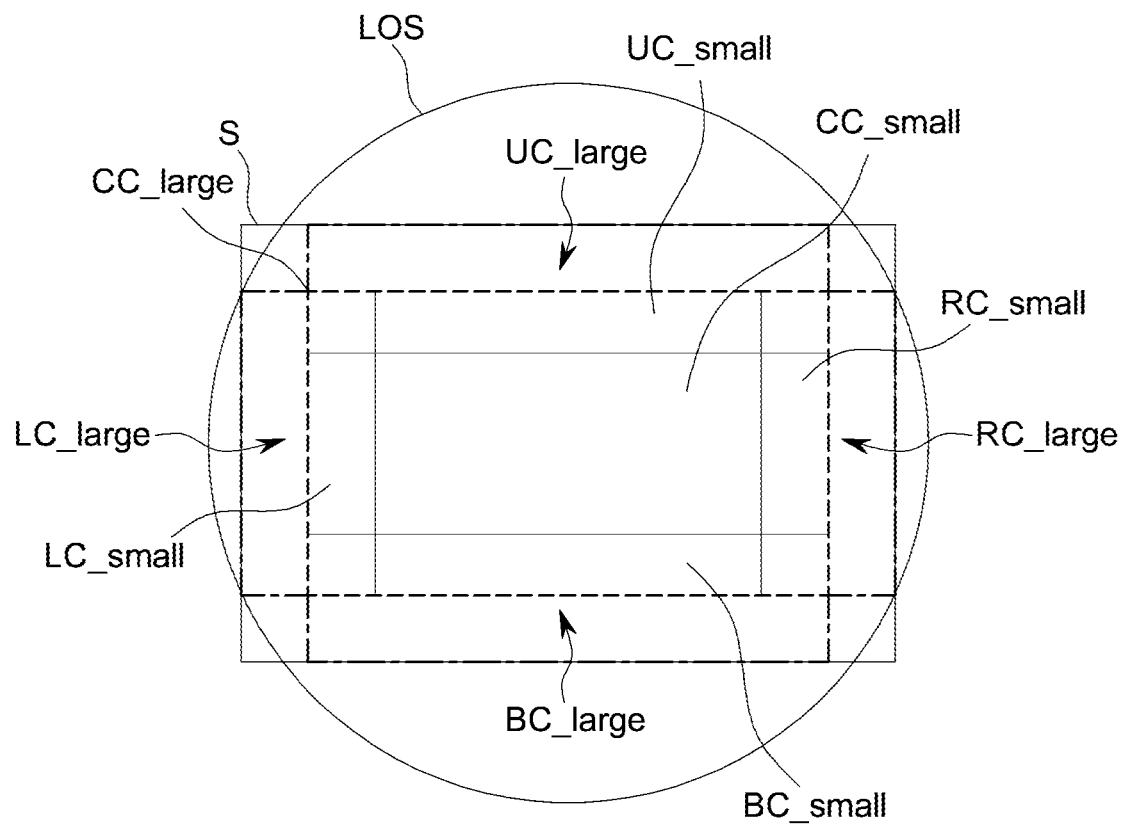
FIGS. 6A and 6B are plan views respectively illustrating a range of an image acquired by the image sensor for electronic image stabilization rather than optical image stabilization (OIS) according to an example embodiment in the present disclosure.
Figure 6B:
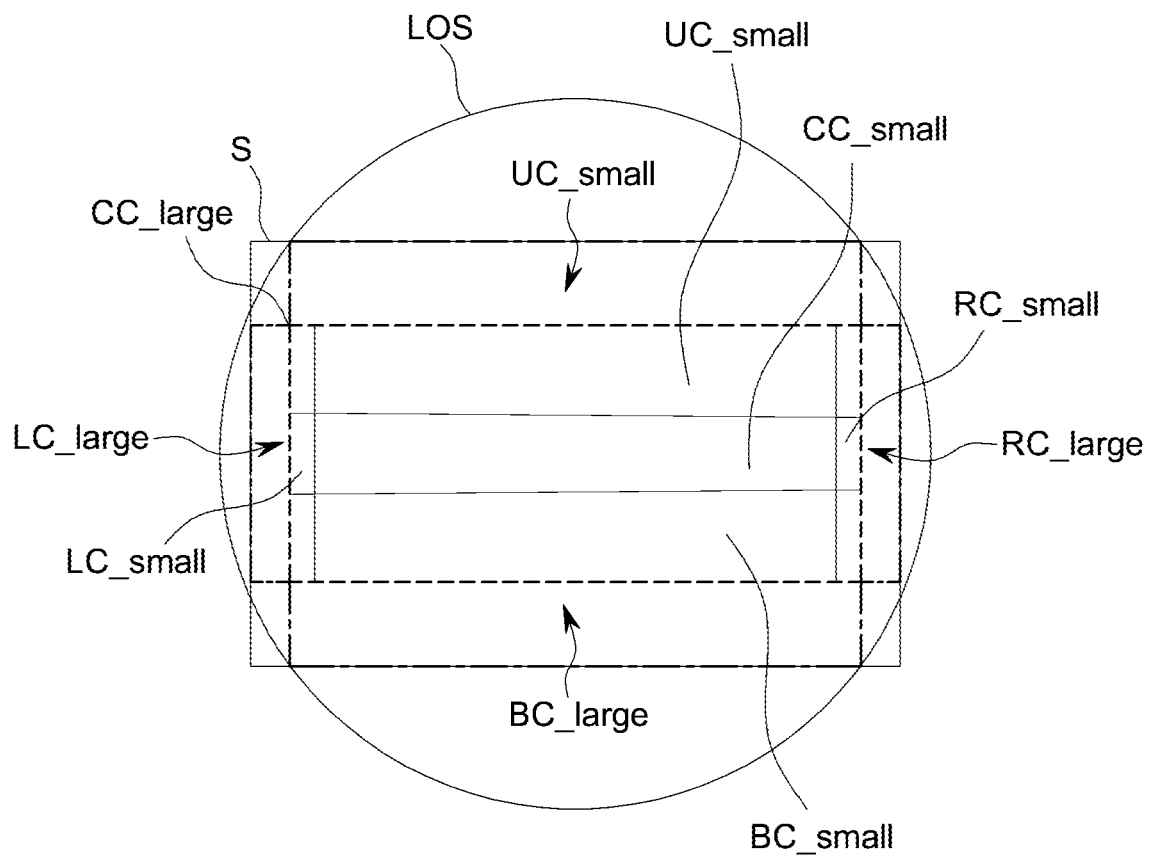

FIGS. 6A and 6B are plan views respectively illustrating a range of an image acquired by the image sensor for electronic image stabilization rather than optical image stabilization (OIS) according to an example embodiment in the present disclosure.

Referring to FIGS. 6A and 6B, OIS may be replaced with electronic image stabilization (EIS).

For example, referring to FIG. 6A, a central area CC_large or CC_small, one transverse end area LC_large or LC_small, another transverse end area RC_large or RC_small, one longitudinal end area UC_large or UC_small, and another longitudinal end area BC_large or BC_small may be sensed primarily, and the one transverse end area LC_large or LC_small, the other transverse end area RC_large or RC_small, the one longitudinal end area UC_large or UC_small, and the other longitudinal end area BC_large or BC_small may be cropped. Accordingly, the central area CC_large or CC_small may have an image in the second aspect ratio AR 2.

For example, referring to FIG. 6B, a central area CC_large or CC_small, one transverse end area LC_large or LC_small, another transverse end area RC_large or RC_small, one longitudinal end area UC_large or UC_small, and another longitudinal end area BC_large or BC_small may be sensed primarily, and the one transverse end area LC_large or LC_small, the other transverse end area RC_large or RC_small, the one longitudinal end area UC_large or UC_small, and the other longitudinal end area BC_large or BC_small may be cropped. Accordingly, the central area CC_large or CC_small may have an image in the fourth aspect ratio AR 4.

The one transverse end area LC_large or LC_small, the other transverse end area RC_large or RC_small, the one longitudinal end area UC_large or UC_small, and the other longitudinal end area BC_large or BC_small of FIG. 6A may be adjusted to the second aspect ratio AR_2, and the one transverse end area LC_large or LC_small, the other transverse end area RC_large or RC_small, the one longitudinal end area UC_large or UC_small, and the other longitudinal end area BC_large or BC_small of FIG. 6B may be adjusted to the fourth aspect ratio AR_4. Therefore, the one transverse end area LC_large or LC_small, the other transverse end area RC_large or RC_small, the one longitudinal end area UC_large or UC_small, and the other longitudinal end area BC_large or BC_small may be determined based on the selection from the plurality of aspect ratios (e.g., second and fourth aspect ratios).

Figure 7:
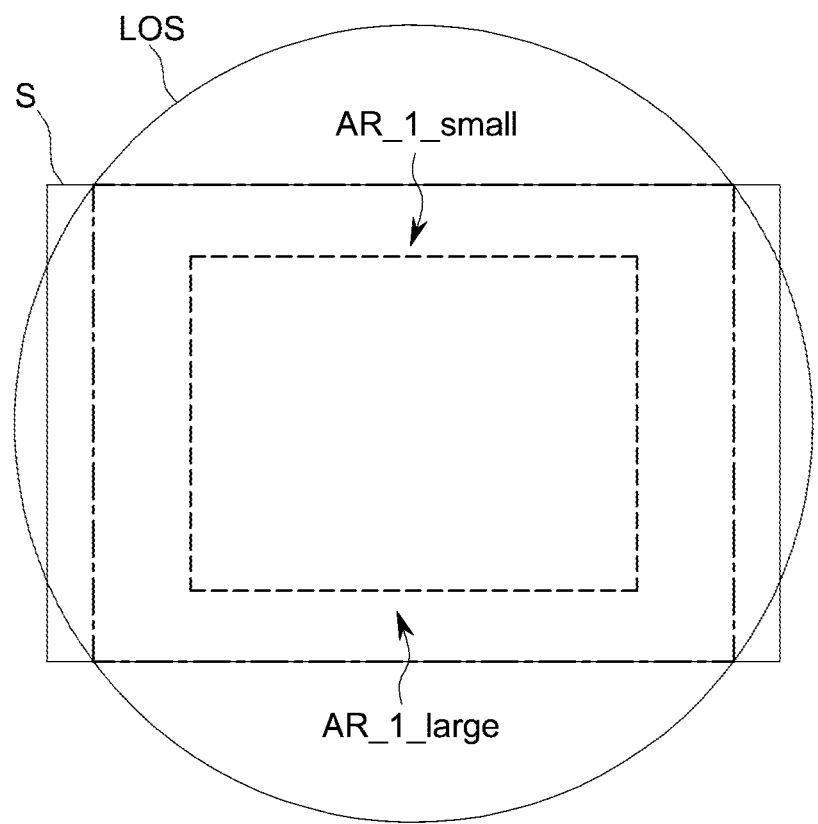
FIG. 7 is a plan view illustrating that the image sensor acquires images having different sizes in the same aspect ratio according to an example embodiment in the present disclosure.

FIG. 7 is a plan view illustrating that the image sensor acquires images having different sizes in the same aspect ratio according to an example embodiment in the present disclosure.

Referring to FIG. 7, a large image AR_1 large in the first aspect ratio may be larger than a small image AR_1 small in the first aspect ratio. For example, the large image AR_1 large and the small image AR_1 small may be selectively sensed, one of the two being used in sensing a video image and the other of the two being used in sensing a photographic image.

For example, the number of pixels and a horizontal angle of view used in sensing a large image AR_1 large may be 100M and 100 degrees, and the number of pixels and a horizontal angle of view used in sensing a small image AR_1 small may be 48M and 70 degrees.

FIG. 8 is a block diagram schematically illustrating the image sensor according to an example embodiment in the present disclosure.

Referring to FIG. 8, the image sensor S may include a plurality of pixels PX arranged in an array form along a plurality of rows and a plurality of columns. Each of the plurality of pixels PX may include at least one photoelectric conversion element generating electric charges in response to light, and a pixel circuit generating a pixel signal corresponding to the electric charges generated by the photoelectric conversion element. The photoelectric conversion device may include a photodiode formed of a semiconductor material and/or an organic photodiode formed of an organic material.

As an example, the pixel circuit may include a floating diffusion, a transfer transistor, a reset transistor, a driving transistor, and a selection transistor. The configuration of the pixels PX may be different between example embodiments. As an example, each of the pixels PX may include an organic photodiode including an organic material, or may be implemented as a digital pixel. When the pixels PX are implemented as digital pixels, each of the pixels PX may include an analog-to-digital converter for outputting a digital pixel signal.

Referring to FIG. 8, an integrated circuit (IC) may include circuits for controlling the image sensor S. As an example, the IC may include a row driver 21, a readout circuit 22, a column driver 23, and a control logic 24. The row driver 21 may drive the plurality of pixels PX in row line units. For example, the row driver 21 may generate a transfer control signal for controlling the transfer transistor of the pixel circuit, a reset control signal for controlling the reset transistor of the pixel circuit, a selection control signal for controlling the selection transistor of the pixel circuit, and the like, and input the generated signals to the plurality of pixels PX in row line units.

The readout circuit 22 may include correlated double samplers (CDSs) and an analog-to-digital converter (ADC). The correlated double samplers may be connected to the plurality of pixels PX through column lines. The correlated double samplers may read out pixel signals through the column lines from a plurality of pixels PX connected to a row line selected according to a row line selection signal of the row driver 21. The analog-to-digital converter may convert the pixel signals detected by the correlated double samplers into digital pixel signals and transmit the digital pixel signals to the column driver 23.

The column driver 23 may include a latch or a buffer circuit capable of temporarily storing the digital pixel signals, and an amplifier circuit, and may process the digital pixel signals received from the readout circuit 22. The row driver 21, the readout circuit 22, and the column driver 23 may be controlled by the control logic 24. The control logic 24 may include a timing controller for controlling timings at which the row driver 21, the readout circuit 22, and the column driver 23 are operated.

Among the plurality of pixels PX, pixels PX disposed at the same position in a horizontal direction may share the same column line. As an example, the pixels PX disposed at the same position in a vertical direction may be simultaneously selected by the row driver 21 and may output pixel signals through column lines. In an example embodiment, the readout circuit 22 may simultaneously acquire the pixel signals from the pixels PX selected by the row driver 21 through column lines. The pixel signal may include a reset voltage and a pixel voltage, and the pixel voltage may be a voltage in which electric charges generated in response to light in each of the pixels PX are reflected to the reset voltage.

A distance PL between the plurality of pixels PX may correspond to a longitudinal length or a transverse length of each of the plurality of pixels PX, and may be larger than 0.5 μm and smaller than 0.9 μm, but is not limited thereto.

Figure 9A:
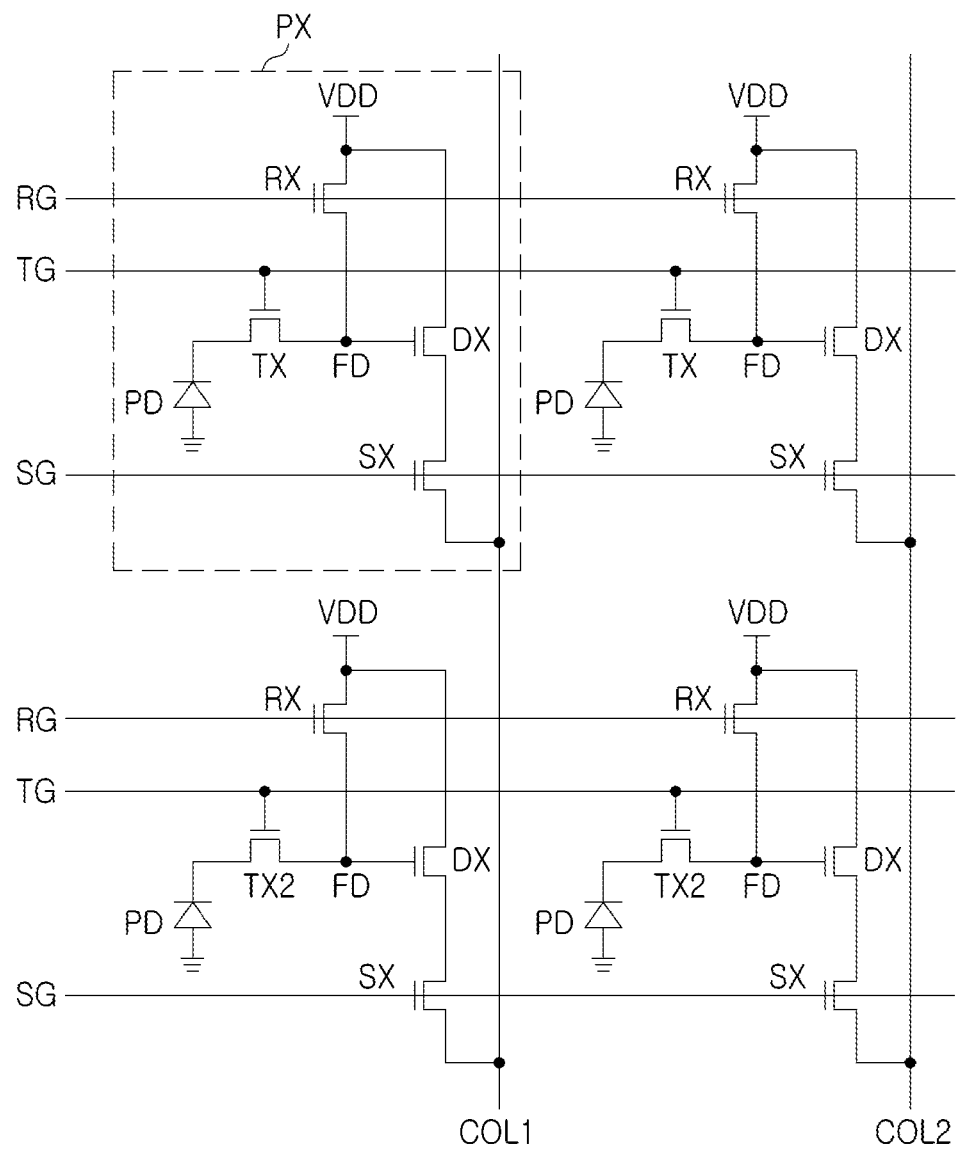
FIGS. 9A and 9B are diagrams schematically illustrating a pixel circuit of the image sensor according to an example embodiment in the present disclosure.
Figure 9B:
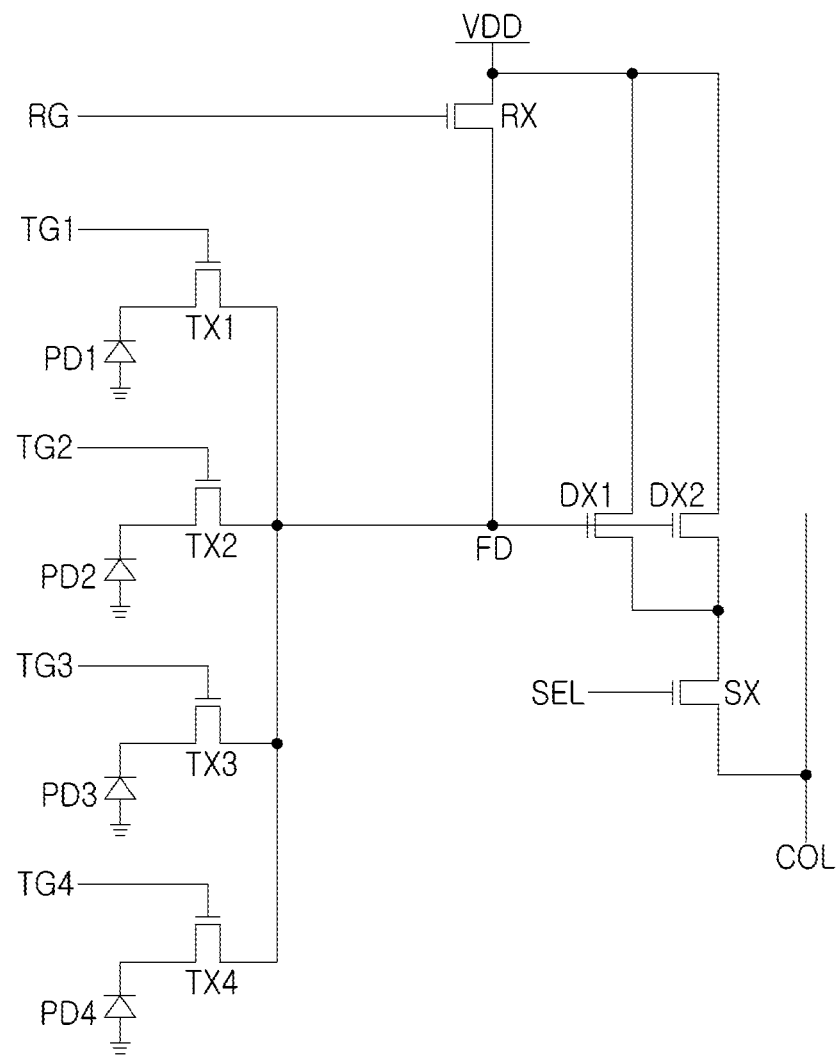

FIGS. 9A and 9B are diagrams schematically illustrating the pixel circuit of the image sensor according to an example embodiment in the present disclosure.

First, referring to FIG. 9A, each of the plurality of pixels PX may include a photodiode PD and a pixel circuit, and the pixel circuit may include a transfer transistor TX, a reset transistor RX, a selection transistor SX, and a driving transistor DX. In addition, the pixel circuit may include a floating diffusion region FD in which electric charges generated by the photodiode PD are accumulated.

The photodiode PD may generate and accumulate electric charges in response to light incident from the outside. In some example embodiments, the photodiode PD may be replaced with a phototransistor, a photogate, a pinned photodiode, or the like. The transfer transistor TX may transfer electric charges generated by the photodiode PD to the floating diffusion region FD when the transfer transistor TX is turned on via a transfer control signal TG. The floating diffusion region FD may store electric charges generated by the photodiode PD. A voltage output from the driving transistor DX may vary depending on an amount of the electric charges accumulated in the floating diffusion region FD.

The reset transistor RX may remove electric charges accumulated in the floating diffusion region FD to reset the voltage of the floating diffusion region FD. A drain electrode of the reset transistor RX may be connected to the floating diffusion region FD, and a source electrode of the reset transistor RX may be connected to a power voltage VDD. When the reset transistor RX is turned on via a reset control signal RG, the power voltage VDD connected to the source electrode of the reset transistor RX may be applied to the floating diffusion region FD, and the reset transistor RX may remove electric charges accumulated in the floating diffusion region FD.

The driving transistor DX may operate as a source follower buffer amplifier. The driving transistor DX may amplify a voltage change of the floating diffusion region FD and output the amplified voltage change to one of the column lines COL1 and COL2. The selection transistor SX may select pixels PX to be read in row units. When the selection transistor SX is turned on via a selection control signal SG, a voltage of the driving transistor DX may be output to one of the column lines COL1 and COL2. As an example, when the selection transistor SX is turned on, a reset voltage or a pixel voltage may be output through the column lines COL1 and COL2.

In an example embodiment illustrated in FIG. 9A, each of the plurality of pixels PX may include not only a photodiode PD and a transfer transistor TX, but also a reset transistor RX, a selection transistor SX, a driving transistor DX. On the other hand, in an example embodiment illustrated in FIG. 9B, two or more pixels adjacent to each other may share at least some of the transistors included in the pixel circuit.

As an example, a first photodiode PD1 and a first transfer transistor TX1 of a first pixel may be connected to the floating diffusion region FD. Similarly, second to fourth photodiodes PD2 to PD4 of second to fourth pixels PX2 to PX4 may be connected to the floating diffusion region FD through second to fourth transfer transistors TX2 to TX4. As another example, the first to fourth transfer transistors TX1 to TX4 may be connected commonly to one floating diffusion region FD by connecting floating diffusion regions FD included in the respective pixels to each other using wiring patterns or the like.

Meanwhile, the pixel circuit may include a reset transistor RX, first and second driving transistors DX1 and DX2, and a selection transistor SX. The first to fourth transfer transistors TX1 to TX4 may be controlled according to first to fourth control signals TG1 to TG4, the reset transistor RX may be controlled according to a reset control signal RG, and the selection transistor SX may be controlled according to a selection control signal SEL. The column line COL may function as described above for the column lines COL1 and COL2. As an example, each of the four pixels may further include one transistor in addition to the transfer transistor TX. Two of the four transistors included in the four pixels may be connected to each other in parallel to be provided as first and second driving transistors DX1 and DX2, one of the remaining two transistors may be provided as a selection transistor SX, and the other one may be provided as a reset transistor RX.

However, the pixel circuit described with reference to FIG. 9B is merely an example, and is not necessarily limited to such a form. As an example, one of the four transistors may be allocated as a driving transistor, another one of the four transistors may be allocated as a selection transistor, and the two remaining transistors may be connected to each other in series and allocated as first and second reset transistors, thereby implementing an image sensor capable of adjusting a conversion gain of a pixel. Alternatively, the pixel circuit may vary depending on the number of transistors included in each of the pixels.

Figure 10:
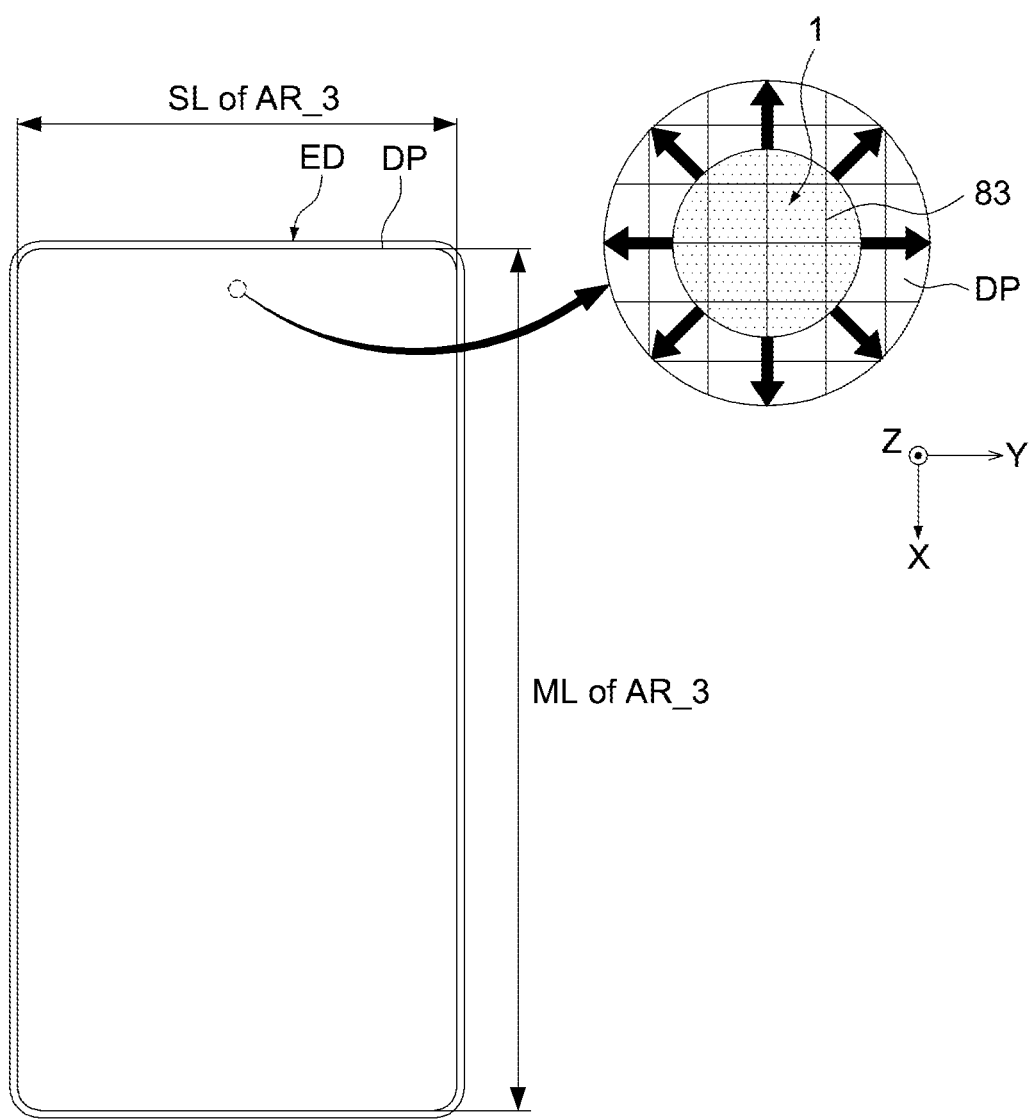
FIGS. 10 and 11 are diagrams illustrating an electronic device including the camera module according to an example embodiment in the present disclosure.
Figure 11:
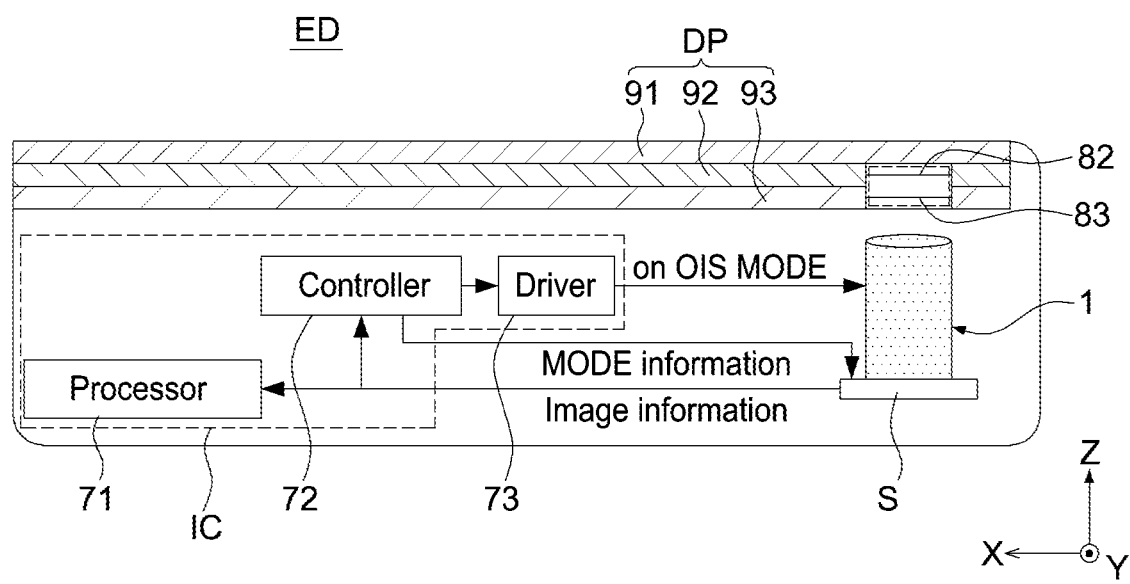

FIGS. 10 and 11 are diagrams illustrating an electronic device including the camera module according to an example embodiment in the present disclosure.

Referring to FIGS. 10 and 11, an electronic device ED including the camera module 1 according to an example embodiment in the present disclosure may include an image sensor S according to an example embodiment in the present disclosure, and include at least one of an IC and a display member DP. For example, the camera module 1 may be one or more embodiments of the camera module 1 described above with reference to FIGS. 1 through 9A and 9B.

The IC may receive an image (image information) sensed by the image sensor S and generate information on a display screen based on the image.

The display member DP may output a display screen. For example, the display member DP may output a display screen in an aspect ratio selected from a plurality of different aspect ratios. For example, the plurality of different aspect ratios may include at least three of 4/3, 16/9, 20/9, and 21/9.

For example, the display member DP may output a display screen in an aspect ratio selected from a first aspect ratio (e.g., 4/3), which is lower than the predetermined aspect ratio (e.g., 16/10 or 16/11) of the image sensor S, and a second aspect ratio (e.g., 16/9, 20/9, or 21/9), which is higher than the predetermined aspect ratio of the image sensor S.

For example, a difference between the plurality of different aspect ratios (e.g., 4/3, 16/9, 20/9, and 21/9) may be larger than a difference between an aspect ratio of the display member DP (e.g., equivalent to the third aspect ratio AR_3) and an aspect ratio (e.g., the third aspect ratio AR_3) closest to the aspect ratio of the display member among the plurality of different aspect ratios. The aspect ratio of the display member DP may be a value obtained by dividing a long-axis length ML of AR_3 by a short-axis length SL of AR_3.

For example, the display member DP may include at least one of a display cover member 91, a touch sensor panel 92, and a display panel 93. The display cover member 91 may be transparent like glass, and may be configured to protect the display member DP from external impact. The touch sensor panel 92 may sense a touch of a user of an electronic device or the like, and may include an electric wire 82. The display panel 93 may output a display screen, and may include an electric wire 83.

For example, the display member DP may be disposed to overlap the camera module 1 along the optical axis (Z-axis) in order to output a display screen in a considerably wide aspect ratio. For example, a structure applicable to the camera module 1 for OIS correction may move the camera module 1 to sense an image while avoiding the electric wires 82 and 83. One surface of the electronic device ED may be wider than one surface of the display member DP, and thus, the camera module 1 may not overlap the display member DP along the optical axis (Z-axis) depending on design.

For example, the IC may include at least one of a processor 71, a controller 72, and a driver 73, and may be electrically connected to the image sensor S. For example, when the sensor substrate on which the image sensor S is disposed is a rigid-flexible printed circuit board, the IC may be electrically connected to the image sensor S in a flexible manner through a flexible portion of the rigid-flexible printed circuit board.

For example, the processor 71 may perform information processing for the overall operation of the electronic device ED, the controller 72 may perform information processing for the overall control of the image sensor S, and the driver 73 may output a signal (e.g., a current flowing in a coil) for moving the camera module 1.

For example, the IC may determine whether to use the OIS mode for moving the lens module or the sensor substrate to stabilize an image (image information) sensed by the image sensor S, and determine whether to use at least some (e.g., 4/3 and 20/9) of the plurality of aspect ratios based on whether the OIS mode is used.

For example, in order to process an image (image information) sensed by the image sensor S for EIS, the IC may crop one longitudinal end area, the other longitudinal end area, one transverse end area, and the other transverse end area of the image. Here, one longitudinal end area, the other longitudinal end area, one transverse end area, and the other transverse end area may be determined based on the selection from the plurality of aspect ratios (e.g., 16/9 and 21/9).

As set forth above, the image sensor according to an example embodiment in the present disclosure is capable of efficiently sensing images having various aspect ratios and/or an aspect ratio of a wide angle of view.

In addition, the camera module according to an example embodiment in the present disclosure can be made in a small size in an easy manner (e.g., a reduction in length in an optical axis direction) while ensuring performance (e.g., image sensing efficiency).

In addition, the electronic device according to an example embodiment in the present disclosure is capable of efficiently outputting images having various aspect ratios and/or an aspect ratio of a wide angle of view, with no substantial increase in size.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   an image sensor;
   a lens module disposed on the image sensor;
   a sensor substrate configured to provide a space to dispose the image sensor thereon;
   a first actuator, configured to move at least one of the image sensor and the lens module in a direction perpendicular to an optical axis direction,
   wherein the image sensor comprises:
      a plurality of pixels arranged in a predetermined aspect ratio to sense an image in an optical axis direction, wherein the predetermined aspect ratio is higher than 4/3 and lower than 16/9, and
      wherein an image focused on the image sensor through the lens module comprises a horizontal angle of view of greater than 120 degrees, a vertical angle of view of greater than 90 degrees, and an optical distortion amount of less than 3%, and
      wherein each of a horizontal Optical Image Stabilization (OIS) correction angle and a vertical OIS correction angle is 3 degrees or more and 5 degrees or less, and a diagonal OIS correction angle is 4 degrees or more and 7 degrees or less.

2. The camera module of claim 1, wherein the predetermined aspect ratio is higher than 16/11.5 and lower than 16/9.5.

3. The camera module of claim 1, wherein each of the plurality of pixels has a longitudinal length or a transverse length of larger than 0.5 μm and smaller than 0.9 μm, and
   wherein DL is larger than 8 mm and smaller than 14.4 mm, DL being a diagonal length from one corner between one longitudinal end and one transverse end to another corner between another longitudinal end and another transverse end of an area where the plurality of pixels are arranged.

4. The camera module of claim 1, wherein among the plurality of pixels, a pixel closest to a center of an area where the plurality of pixels are arranged is in an active state, and
   wherein among the plurality of pixels, a pixel closest to one corner of the area where the plurality of pixels are arranged is in an inactive state.

5. The camera module of claim 1, wherein the lens module is disposed on the plurality of pixels of the image sensor.

6. The camera module of claim 5,
   wherein the first actuator is configured to move the sensor substrate to change a positional relationship between the image sensor and the lens module.

7. The camera module of claim 5, further comprising a second actuator configured to move the lens module to change a positional relationship between the image sensor and the lens module.

8. An electronic device comprising:
   the camera module of claim 1;
   an integrated circuit (IC) configured to receive the image sensed by the image sensor and generate information on a display screen based on the image; and
   a display member configured to output the display screen.

9. The electronic device of claim 8, wherein the display member outputs the display screen in an aspect ratio selected from a first aspect ratio lower than the predetermined aspect ratio of the image sensor and a second aspect ratio higher than the predetermined aspect ratio of the image sensor.

10. The electronic device of claim 8, wherein the display member outputs the display screen in an aspect ratio selected from a plurality of different aspect ratios, and
    wherein a difference between the plurality of different aspect ratios is larger than a difference between an aspect ratio of the display member and an aspect ratio closest to the aspect ratio of the display member among the plurality of different aspect ratios.

11. The electronic device of claim 10, wherein the plurality of different aspect ratios for the display screen include at least three of 4/3, 16/9, 20/9, and 21/9.

12. The electronic device of claim 8,
wherein the display member outputs the display screen in an aspect ratio selected from a plurality of different aspect ratios, and
wherein the IC determines whether to use an optical image stabilization (OIS) mode for moving the lens module or the sensor substrate to stabilize the image sensed by the image sensor, and determines whether to use at least some of the plurality of aspect ratios based on whether the OIS mode is used.

13. An electronic device, comprising:
a camera module comprising:
an image sensor;
a lens module disposed on the image sensor;
a sensor substrate configured to provide a space to dispose the image sensor thereon;
a first actuator, configured to move at least one of the image sensor and the lens module in a direction perpendicular to an optical axis direction,
wherein the image sensor comprises:
a plurality of pixels arranged in a predetermined aspect ratio to sense an image in an optical axis direction,
wherein the predetermined aspect ratio is higher than 4/3 and lower than 16/9,
an integrated circuit (IC) configured to receive the image sensed by the image sensor and generate information on a display screen based on the image; and
a display member configured to output the display screen,
wherein the IC crops one longitudinal end area, another longitudinal end area, one transverse end area, and another transverse end area of the image sensed by the image sensor to process the image for electronic image stabilization (EIS),
wherein the display member outputs the display screen in an aspect ratio selected from a plurality of different aspect ratios, and
wherein the one longitudinal end area, the other longitudinal end area, the one transverse end area, and the other transverse end area are determined based on the selection from the plurality of aspect ratios.

14. A camera module, comprising:
an image sensor; and
a lens module disposed on the image sensor,
wherein the image sensor comprises:
a predetermined aspect ratio AR_S having a first area,
wherein AR_S is greater than a first aspect ratio AR_1 having a second area and less than a second aspect ratio AR_2 having a third area, such that a sum of differences between the first area and the second area, and the first area and the third area is a minimum area of the image sensor that is excluded to obtain an image,
wherein AR_1 is 4/3 and AR_2 is in a range of 16/9 to 21/9, and
wherein an image focused on the image sensor through the lens module comprises a horizontal angle of view of greater than 120 degrees, a vertical angle of view of greater than 90 degrees, and an optical distortion amount of less than 3%.

15. The camera module of claim 14, wherein a number of pixels arranged in the predetermined aspect ratio AR_S is in a range of 116 million (M) to 120M.

16. The camera module of claim 14,
wherein a distance in an optical axis direction between the space in which the image sensor is disposed and the lens module is 9 mm or less.

17. The camera module of claim 16, wherein a number of pixels arranged in the predetermined aspect ratio AR_S is in a range of 116M to 120M, and
wherein of the number of pixels, 100M or more are arranged in the first aspect ratio AR_1 and 96M or less are arranged in the second aspect ratio AR_2.

18. The camera module of claim 16, further comprising a first actuator moving the image sensor in a direction perpendicular to the optical axis direction to change a positional relationship between the image sensor and the lens module.

19. The camera module of claim 18, further comprising a second actuator moving the lens module in the optical axis direction to focus the lens module.

20. An electronic device comprising:
the camera module of claim 16;
an integrated circuit (IC) receiving the image sensed by the image sensor and generating information on a display screen based on the image; and
a display member outputting the display screen.

* * * * *